US011195365B2

(12) United States Patent
Jiang

(10) Patent No.: US 11,195,365 B2
(45) Date of Patent: Dec. 7, 2021

(54) PARKING CHARGING METHOD, APPARATUS, AND ELECTRONIC DEVICE

(71) Applicant: Advanced New Technologies Co., Ltd., George Town (KY)

(72) Inventor: Guofei Jiang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/889,681

(22) Filed: Jun. 1, 2020

(65) Prior Publication Data

US 2020/0294345 A1 Sep. 17, 2020

Related U.S. Application Data

(63) Continuation of application No. PCT/CN2019/075776, filed on Feb. 22, 2019.

(30) Foreign Application Priority Data

May 31, 2018 (CN) .......................... 201810552839.4

(51) Int. Cl.
*G06Q 50/30* (2012.01)
*G07F 17/24* (2006.01)
(Continued)

(52) U.S. Cl.
CPC ........... *G07F 17/24* (2013.01); *G06Q 20/145* (2013.01); *G06Q 30/0284* (2013.01); *G06Q 50/30* (2013.01); *G06Q 2240/00* (2013.01)

(58) Field of Classification Search
CPC .. G07F 17/24; G06Q 20/145; G06Q 30/0284; G06Q 50/30; G06Q 2240/00
See application file for complete search history.

(56) References Cited

U.S. PATENT DOCUMENTS

| 2009/0121898 A1 | 5/2009 | Jia et al. |
| 2015/0221140 A1 | 8/2015 | Eid |

(Continued)

FOREIGN PATENT DOCUMENTS

| CN | 101241609 | 8/2008 |
| CN | 101811481 | 8/2010 |

(Continued)

OTHER PUBLICATIONS

Ankorus, "Ankorus Asset-Backed Tokens: The First True Bridge Between Cryptocurrency and Finance", Oct. 11, 2017, Medium. com, https://medium.com/@Ankorus/ankorus-asset-backed-tokens-the-first-true-bridge-between-cryptocurrency-and-finance-3d027a1de225 (Year: 2017).*

(Continued)

*Primary Examiner* — Emmett K. Walsh
*Assistant Examiner* — Michelle E Carey
(74) *Attorney, Agent, or Firm* — Fish & Richardson P.C.

(57) ABSTRACT

One or more implementations of the present specification provide a parking charging method, apparatus, and electronic device, applied to a parking charging system. The method includes the following: obtaining vehicle information of a parked vehicle in a parking space, where the vehicle information has a corresponding user account on a payment platform; publishing a vehicle parking record to a blockchain network by using a first blockchain node corresponding to the parking charging system in the blockchain network, where the vehicle parking record includes parking duration of the parked vehicle in the parking space; and performing an asset transfer operation related to the payment platform based on the vehicle parking record each time the parking duration reaches first predetermined duration, so as to charge an asset corresponding to the first predetermined duration.

25 Claims, 12 Drawing Sheets

(51) Int. Cl.
  *G06Q 20/14* (2012.01)
  *G06Q 30/02* (2012.01)

(56) References Cited

U.S. PATENT DOCUMENTS

| | | | | |
|---|---|---|---|---|
| 2015/0356498 | A1* | 12/2015 | Casanova | G07B 15/02 |
| | | | | 705/13 |
| 2016/0232500 | A1 | 8/2016 | Wang et al. | |
| 2017/0178417 | A1* | 6/2017 | Bekas | G07B 15/063 |
| 2018/0101914 | A1 | 4/2018 | Samuel et al. | |
| 2018/0122152 | A1 | 5/2018 | Shin | |
| 2019/0266601 | A1* | 8/2019 | Allen | G06F 21/645 |
| 2019/0325522 | A1* | 10/2019 | Bathia | G06K 9/00785 |

FOREIGN PATENT DOCUMENTS

| | | | | |
|---|---|---|---|---|
| CN | 102044154 | 5/2011 | | |
| CN | 102855671 | 1/2013 | | |
| CN | 102915569 | 2/2013 | | |
| CN | 102938087 | 2/2013 | | |
| CN | 203133903 | 8/2013 | | |
| CN | 103700149 | 4/2014 | | |
| CN | 104021594 | 9/2014 | | |
| CN | 104112296 | 10/2014 | | |
| CN | 104157017 | 11/2014 | | |
| CN | 104282045 | 1/2015 | | |
| CN | 105069850 | 11/2015 | | |
| CN | 105469453 | 4/2016 | | |
| CN | 105488722 | 4/2016 | | |
| CN | 105590346 | 5/2016 | | |
| CN | 105741367 | 7/2016 | | |
| CN | 106504355 | 3/2017 | | |
| CN | 106228840 | 7/2017 | | |
| CN | 106952352 | 7/2017 | | |
| CN | 106960594 | 7/2017 | | |
| CN | 107122937 | 9/2017 | | |
| CN | 107194778 | 9/2017 | | |
| CN | 107316347 | 11/2017 | | |
| CN | 107330681 | 11/2017 | | |
| CN | 107464118 | 12/2017 | | |
| CN | 107492262 | 12/2017 | | |
| CN | 107993298 | 5/2018 | | |
| CN | 108038925 | 5/2018 | | |
| CN | 108064017 | 5/2018 | | |
| CN | 108091167 | 5/2018 | | |
| CN | 108805995 | 11/2018 | | |
| CN | 108876937 | 11/2018 | | |
| CN | 108876946 | 11/2018 | | |
| CN | 108876947 | 11/2018 | | |
| DE | 29617339 | 1/1997 | | |
| JP | 2001022980 | 1/2001 | | |
| JP | 3824867 | 9/2006 | | |
| JP | 3824876 | 9/2006 | | |
| JP | 2008097616 | 4/2008 | | |
| JP | 2008276516 | 11/2008 | | |
| JP | 2009199442 | 9/2009 | | |
| JP | 5380139 | 1/2014 | | |
| JP | 2015184999 | 10/2015 | | |
| KR | 20170001870 | 1/2017 | | |
| KR | 20170104868 | 9/2017 | | |
| TW | 543010 | 7/2003 | | |
| TW | 582603 | 4/2004 | | |
| TW | M557424 | 3/2018 | | |
| WO | WO-2008073056 | A1* | 6/2008 | G07C 1/30 |
| WO | 2017190794 | 11/2017 | | |
| WO | WO 2018020376 | 2/2018 | | |

OTHER PUBLICATIONS

Koester, W. (2018). Why is blockchain suddenly so hot? CFO.Com, , n/a. Retrieved from https://dialog.proquest.com/professional/docview/1999798924?accountid=131444 (Year: 2018).*

Crosby et al., "BlockChain Technology: Beyond Bitcoin," Sutardja Center for Entrepreneurship & Technology Technical Report, Oct. 16, 2015, 35 pages.

Hoi, "Blockchain—Genesis Block, Block, Merkle Tree, Hash," Jan. 16, 2018, retrieved on Jun. 17, 2020, retrieved at URL <https://www.samsonhoi.com/274/blockchain_genesis_block_merkle_tree>, 21 pages (with English translation).

Nakamoto, "Bitcoin: A Peer-to-Peer Electronic Cash System," www.bitcoin.org, 2005, 9 pages.

PCT International Search Report and Written Opinion in International Appln No. PCT/CN2019/075775, dated May 9, 2019, 9 pages (with partial English translation).

PCT International Search Report and Written Opinion in International Appln. No. PCT/CN2019/075747, dated Dec. 5, 2019, 16 pages (with English translation).

PCT International Search Report and Written Opinion in International Appln. No. PCT/CN2019/075776, dated Dec. 5, 2019, 16 pages (with English translation).

PCT International Search Report and Written Opinion in International Appln. No. PCT/CN2019/075777, dated May 5, 2019, 17 pages (with English translation).

Wu et al., "The Introduction of ETC System and Implementation Achievement," Civil Engineering and Water Resources, Apr. 2018, 45(2):32-38 (with English Abstract).

EP Extended Search Report and Written Opinion in European Application No. 19812451.3, dated Feb. 25, 2021, 10 pages.

fetc.net.tw [online], "eTag Parking Instructions Page Intelligen Parking," Oct. 18, 2017, retrieved on Jun. 23, 2021, retrieved from URL<https://parking.fetc.net.tw>, 4 pages (with machine translation).

* cited by examiner

PARKING CHARGING METHOD, APPARATUS, AND ELECTRONIC DEVICE

TECHNICAL FIELD

One or more implementations of the present specification relate to the field of end-user device technologies, and in particular, to parking charging methods, apparatuses, and electronic devices.

BACKGROUND

A parking lot can provide a paid parking service to a user. The user needs to pay a corresponding amount of assets to the parking lot based on parking duration of a vehicle in a parking space, for the management and maintenance of the parking lot. Therefore, the parking duration of the vehicle needs to be calculated in a certain method, so that the user is charged a corresponding parking fee.

SUMMARY

In view of this, one or more implementations of the present specification provide parking charging methods, apparatuses, and electronic devices.

To achieve the previous objective, one or more implementations of the present specification provide the following technical solutions:

A first aspect of the one or more implementations of the present specification provides a parking charging method, applied to a parking charging system, where the method includes the following: obtaining vehicle information of a parked vehicle in a parking space, where the vehicle information has a corresponding user account on a payment platform; publishing a vehicle parking record to a blockchain network by using a first blockchain node corresponding to the parking charging system in the blockchain network, where the vehicle parking record includes parking duration of the parked vehicle in the parking space; and performing an asset transfer operation related to the payment platform based on the vehicle parking record each time the parking duration reaches first predetermined duration, so as to charge an asset corresponding to the first predetermined duration.

A second aspect of the one or more implementations of the present specification provides a parking charging method, applied to a parking charging system, where the method includes the following: obtaining vehicle information of a parked vehicle in a parking space, where the vehicle information has a corresponding user account on a payment platform; publishing a vehicle parking record to a blockchain network by using a first blockchain node corresponding to the parking charging system in the blockchain network, where the vehicle parking record includes parking duration of the parked vehicle in the parking space; and when it is detected that the parked vehicle drives away from the parking space, performing an asset transfer operation related to the payment platform based on the vehicle parking record, so as to charge an asset corresponding to the parking duration.

A third aspect of the one or more implementations of the present specification provides a parking charging apparatus, applied to a parking charging system, where the apparatus includes the following: an acquisition unit, configured to obtain vehicle information of a parked vehicle in a parking space, where the vehicle information has a corresponding user account on a payment platform; a publishing unit, configured to publish a vehicle parking record to a blockchain network by using a first blockchain node corresponding to the parking charging system in the blockchain network, where the vehicle parking record includes parking duration of the parked vehicle in the parking space; and an implementation unit, configured to perform an asset transfer operation related to the payment platform based on the vehicle parking record each time the parking duration reaches first predetermined duration, so as to charge an asset corresponding to the first predetermined duration.

A fourth aspect of the one or more implementations of the present specification provides a parking charging apparatus, applied to a parking charging system, where the apparatus includes the following: an acquisition unit, configured to obtain vehicle information of a parked vehicle in a parking space, where the vehicle information has a corresponding user account on a payment platform; a publishing unit, configured to publish a vehicle parking record to a blockchain network by using a first blockchain node corresponding to the parking charging system in the blockchain network, where the vehicle parking record includes parking duration of the parked vehicle in the parking space; and an implementation unit, configured to: when it is detected that the parked vehicle drives away from the parking space, perform an asset transfer operation related to the payment platform based on the vehicle parking record, so as to charge an asset corresponding to the parking duration.

A fifth aspect of the one or more implementations of the present specification provides an electronic device, including the following: a processor; and a memory, configured to store a processor-executable instruction, where the processor is configured to perform the method described in any one of the previous implementations.

DESCRIPTION OF IMPLEMENTATIONS

Example implementations are described in detail here, and examples of the example implementations are presented in the accompanying drawings. When the following description relates to the accompanying drawings, unless specified otherwise, the same numbers in different accompanying drawings represent same or similar elements. Implementations described below do not represent all implementations consistent with one or more implementations of the present specification. On the contrary, the implementations are only examples of apparatuses and methods that are described in the appended claims in detail and consistent with some aspects of one or more implementations of the present specification.

It is worthwhile to note that in other implementations, steps of a corresponding method are not necessarily performed according to the sequence shown and described in the present specification. In some other implementations, the method can include more or less steps than those described in the present specification. In addition, a single step described in the present specification may be divided into a plurality of steps in other implementations for description. However, a plurality of steps described in the present specification may also be combined into a single step for description in other implementations.

Figure 1:
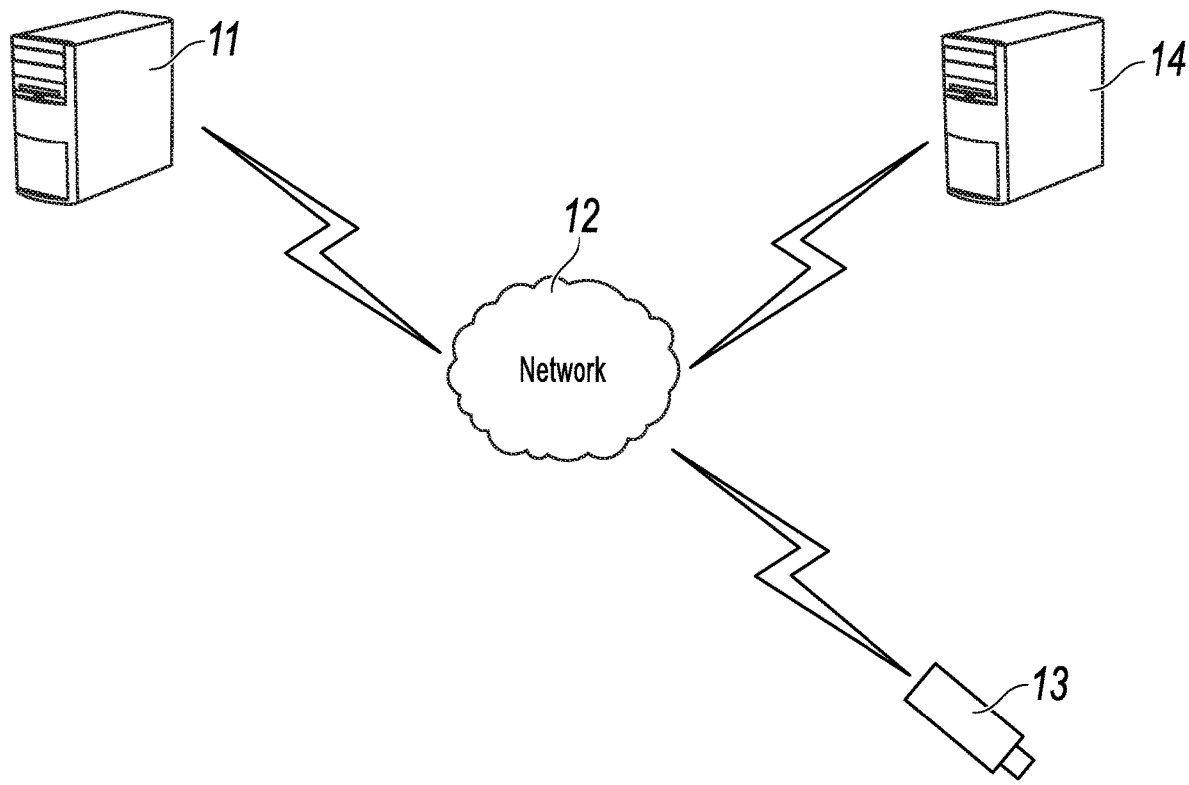
FIG. 1 is a schematic architectural diagram illustrating a parking charging management system, according to an example implementation.

FIG. 1 is a schematic architectural diagram illustrating a parking charging management system, according to an example implementation. As shown in FIG. 1, the system can include a parking charging server 11, a network 12, an Internet of Things device 13, and a payment platform server 14.

The parking charging server 11 can be a physical server including an independent host, or the parking charging server 11 can be a virtual server including a host cluster. In a running process, the parking charging server 11 can run and be implemented as a parking charging system. When a user parks a vehicle in a parking lot managed by the parking charging system, the parking charging system is configured to perform parking charging on the user.

The Internet of Things device 13 can be implemented as at least one of the following types of electronic devices: a monitoring device, a radio frequency identification (RFID) reader, a Bluetooth device, an optical sensor, a signal receiver, etc. Implementations are not limited in one or more implementations of the present specification. The Internet of Things device 13 is configured to collect information about a parked vehicle in the parking lot, and provide the collected vehicle information to the parking charging server 11.

The payment platform server 14 can be a physical server including an independent host, or the payment platform server 14 can be a virtual server including a host cluster. In a running process, the payment platform server 14 can run and be implemented as a payment platform. When a user and the parking charging system each have a registered account on the payment platform, the parking charging system can initiate a request to the payment platform, so that the payment platform automatically transfers an asset from an account corresponding to the user to an account corresponding to the parking charging system.

The network 12 for interaction between the parking charging server 11, the Internet of Things device 13, and the payment platform server 14 can include multiple types of wired or wireless networks. In an implementation, the network 12 can include a public switched telephone network (PSTN) and the Internet. Implementations are not limited in the present specification, certainly.

The parking charging server 11 and the payment platform server 14 each have a corresponding blockchain node in a blockchain network. The blockchain node can maintain a uniform blockchain ledger, and read a transaction record published in the blockchain network from the blockchain ledger, so that the parking charging solution of the present specification can be implemented.

Figure 2:
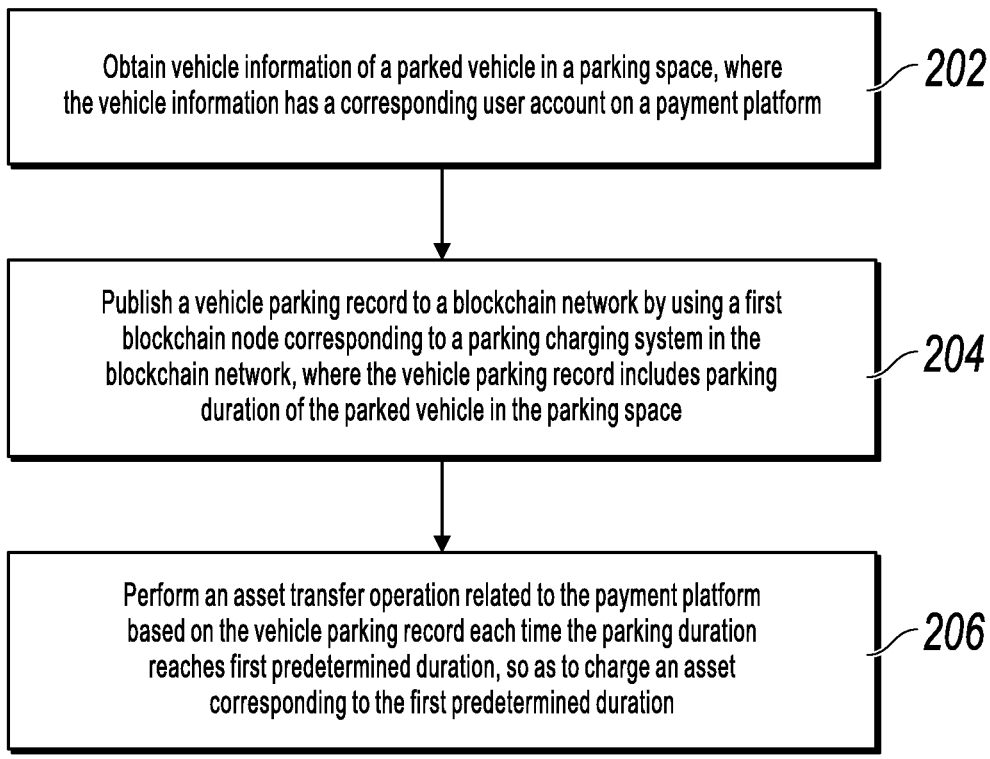
FIG. 2 is a flowchart illustrating a parking charging method, according to an example implementation.

FIG. 2 is a flowchart illustrating a parking charging method, according to an example implementation. As shown in FIG. 2, the method is applied to a parking charging system (e.g., included in the parking charging server 11 shown in FIG. 1), and can include the following steps.

Step 202: Obtain vehicle information of a parked vehicle in a parking space, where the vehicle information has a corresponding user account on a payment platform.

In an implementation, an information acquisition operation can be performed at the parking space by using a first Internet of Things device associated with the parking charging system, and the vehicle information of the parked vehicle can be determined based on information obtained by the first Internet of Things device. The first Internet of Things device includes at least one of the following: a monitoring device, an RFID reader, a Bluetooth device, an optical sensor, a signal receiver, etc. Implementations are not limited in the present specification.

For example, when the first Internet of Things device includes a monitoring device, the monitoring device can photograph an image of the parking space, and analyze content of the photographed image to determine the vehicle information of the parked vehicle.

For example, when the first Internet of Things device includes an RFID reader, the RFID reader can read an RFID signal transmitted by an RFID tag installed on the parked vehicle, where the RFID signal can include the vehicle information of the parked vehicle.

For example, when the first Internet of Things device includes a first Bluetooth device, the Bluetooth device can read a Bluetooth signal sent by a second Bluetooth device installed on the parked vehicle, and the Bluetooth signal can include the vehicle information of the parked vehicle.

For example, when the first Internet of Things device includes an optical sensor, the surface of the parked vehicle can be coated with an optical medium of a predetermined material. The optical medium is used to generate appearance data of the parked vehicle, and the optical sensor can scan the parked vehicle, so as to obtain body surface structure data of the parked vehicle, and use the body surface structure data as the vehicle information of the parked vehicle. The optical medium can be a nano-optical film. After the nano-optical film is coated on an outer surface of the vehicle, a piece of nano-optical film can be formed, to automatically cure a vehicle appearance. Accordingly, the optical sensor can be configured to capture light of a specific wavelength generated or reflected by the optical film, so as to accurately generate the body surface structure data of the vehicle.

For example, when the first Internet of Things device includes a signal receiver, the surface of the parked vehicle can be coated with an electrical medium of a predetermined material. The electrical medium is used to generate appearance data of the parked vehicle, and the signal receiver can scan the parked vehicle, so as to obtain body surface structure data of the parked vehicle, and use the body surface structure data as the vehicle information of the parked vehicle. The electrical medium can be a carbon structural material of a nanometer level. After the carbon structural material is coated on an outer surface of the vehicle, a circuit layer that encloses the vehicle can be formed. The circuit layer can generate an electrical signal uniquely corresponding to the body surface structure data, and send the electrical signal to the signal receiver, so that the electrical signal is used as the vehicle information of the parked vehicle.

In an implementation, the first Internet of Things device can be dedicated to the parking space. In other words, a corresponding first Internet of Things device is configured for each parking space. For example, a corresponding RFID reader is installed on or near each parking space, and only when a vehicle enters a corresponding parking space, the RFID reader can collect an RFID signal transmitted by an RFID tag installed on the vehicle. In another implementation, the first Internet of Things device can be used for the parking space and at least one other parking space. In other words, multiple parking spaces can share one first Internet of Things device. For example, if a camera of a monitoring device faces multiple parking spaces, so that an image photographed by the monitoring device covers the parking spaces, information about vehicles parked in the parking spaces can be collected based on the photographed image collected by the camera, so as to obtain corresponding vehicle information.

In an implementation, when it is determined that there is a parked vehicle in the parking space by using the first Internet of Things device, an information acquisition operation can be further performed on the parked vehicle by using the first Internet of Things device. In other words, the first Internet of Things device can be used to determine that there is a parked vehicle in the parking space, and can also obtain vehicle information of the parked vehicle. For example, when the first Internet of Things device includes a monitoring device, a photographed image collected by the monitoring device can be used to identify a use status of the parking space (i.e., whether there is a vehicle parked in the parking space), and can also be used to identify vehicle information of the parked vehicle in the parking space (e.g., identify a license plate number of the parked vehicle).

In an implementation, when it is determined that there is a parked vehicle in the parking space by using a second Internet of Things device associated with the parking charging system, an information acquisition operation can be further performed on the parked vehicle by using the first Internet of Things device. In other words, the second Internet of Things device is used to determine that there is a parked vehicle in the parking space, and the first Internet of Things device is used to obtain vehicle information of the parked vehicle. For example, the second Internet of Things device can include at least one of the following: an underground induction coil, a ranging device, an infrared detection device, etc. Implementations are not limited in the present specification.

For example, when the second Internet of Things device includes an underground induction coil, the underground induction coil can be installed under the ground of the parking space or at another location, so that a vehicle entering the parking space can trigger the underground induction coil. Further, the second Internet of Things device can directly trigger the first Internet of Things device, or trigger the first Internet of Things device by using the parking charging system, so that the first Internet of Things device obtains the vehicle information of the parked vehicle in the parking space.

For example, when the second Internet of Things device includes a ranging device, the ranging device can be installed above the parking space or at another location for ranging toward the ground of the parking space, and the vehicle entering the parking space can trigger a change of a ranging result of the ranging device. Further, the second Internet of Things device can directly trigger the first Internet of Things device, or trigger the first Internet of Things device by using the parking charging system, so that the first Internet of Things device obtains the vehicle information of the parked vehicle in the parking space.

For example, when the second Internet of Things device includes an infrared detection device, the infrared detection device can be installed above or in front of the parking space or at another location, so that the vehicle entering the parking space can trigger the infrared detection device to generate a predetermined infrared detection result. Further, the second Internet of Things device can directly trigger the first Internet of Things device, or trigger the first Internet of Things device by using the parking charging system, so that the first Internet of Things device obtains the vehicle information of the parked vehicle in the parking space.

In an implementation, the vehicle information can include any information used to represent a vehicle identity, and implementations are not limited in the present specification. For example, the vehicle information can include at least one of the following: a license plate number, a paint color, a vehicle model, body surface structure data, vehicle driver information, vehicle passenger information, etc. Implementations are not limited in the present specification.

Step 204: Publish a vehicle parking record to a blockchain network by using a first blockchain node corresponding to the parking charging system in the blockchain network, where the vehicle parking record includes parking duration of the parked vehicle in the parking space.

In an implementation, the parking charging system has a corresponding first blockchain node in the blockchain network. There are several blockchain nodes in the blockchain network. Distributed ledger is used between the blockchain nodes. Each blockchain node maintains full ledger information, and an agreement can be reached between the blockchain nodes by using a consensus algorithm, so as to ensure that a uniform blockchain ledger is jointly maintained by the blockchain nodes. In other words, the first blockchain node and other blockchain nodes maintain full blockchain ledgers with the same content.

In an implementation, because the parking charging system corresponds to the first blockchain node, the vehicle parking record can be published to the blockchain network by using the first blockchain node, so that the vehicle parking record is recorded in the blockchain ledger. Because data registered in the blockchain network cannot be tampered with, the vehicle parking record recorded in the blockchain ledger has enough reliability and can be trusted by each blockchain node. Therefore, in subsequent processes, when an asset transfer operation is initiated to the payment platform based on the vehicle parking record, the payment platform can fully trust information such as the parking duration included in the vehicle parking record, thereby reducing a risk of automatically making asset transfer and completing automatic parking charging.

Step 206: Perform an asset transfer operation related to the payment platform based on the vehicle parking record each time the parking duration reaches first predetermined duration, so as to charge an asset corresponding to the first predetermined duration.

In an implementation, the parking duration of the parked vehicle in the parking space is counted cyclically, and the asset transfer operation related to the payment platform is performed based on the vehicle parking record each time the parking duration reaches the first predetermined duration, so that a corresponding parking fee can be charged stage by stage when the parked vehicle is parked in the parking space. Therefore, after a driver drives the parked vehicle away from the parking space, parking fee payment operations are not triggered, including both a payment operation actively performed by the driver or a payment operation automatically triggered by the parking charging system for the payment platform. Actually, a certain delay may be caused due to processes such as data processing and data transmission even in the payment operation automatically triggered by the parking charging system. Therefore, according to the technical solution of the present specification, the delay that occurs in the process of driving the parked vehicle away can be avoided, and the process that the parked vehicle drives away from a parking lot is not interrupted, so that persons (the driver and a passenger) in the vehicle are unaware of the parking fee payment process, thereby enhancing user experience.

In an implementation, the parking charging system can send an asset transfer request to the payment platform, where the asset transfer request includes a transaction serial number (or other information that uniquely indicates the vehicle parking record) of the vehicle parking record in the blockchain network, so that the payment platform can search a blockchain ledger based on the transaction serial number to determine authenticity and validity of the vehicle parking record. For example, when the payment platform has a corresponding second blockchain node in the blockchain network, the payment platform can view a blockchain ledger maintained by the second blockchain node, to perform verification on a corresponding vehicle parking record. Or, the payment platform can perform verification on a vehicle parking record recorded in a blockchain ledger by using a blockchain node corresponding to another object in the blockchain network.

In an implementation, the asset transfer request can include only the transaction serial number, and the payment platform can calculate a payment amount based on the parking duration included in the vehicle parking record corresponding to the transaction serial number and a predefined charging criterion.

In an implementation, the asset transfer request can include the transaction serial number and a payment amount, and the payment platform can verify whether the payment amount matches the parking duration in the vehicle parking record based on a predefined charging criterion (e.g., 1 yuan/hour), so as to complete the asset transfer only when the payment amount matches the parking duration.

In an implementation, the asset transfer request can include the transaction serial number, a payment amount, and a charging criterion, and the payment platform verifies whether the payment amount matches the parking duration in the vehicle parking record, so as to complete the asset transfer only when the payment amount matches the parking duration.

In an implementation, the payment platform can transfer an offchain asset (i.e., an asset outside the blockchain network, different from a blockchain asset) based on the asset transfer request initiated by the parking charging system. For example, when the vehicle information has a corresponding user account on the payment platform, the payment platform can directly transfer the corresponding asset from the user account to an account of the parking charging system on the payment platform. For another example, when a credit limit of the user account is not exceeded, the charged asset corresponding to the first predetermined duration comes from a credit asset related to the user account. For example, the payment platform can transfer the corresponding asset from an account of the payment platform to an account of the parking charging system on the payment platform, regardless of whether the user account has sufficient assets. Subsequently, an owner of the user account can transfer the asset advanced by the payment platform to the account of the payment platform at any time within a predetermined time period. Otherwise, the owner needs to transfer more assets to the account of the payment platform after the predetermined time period expires, and the amount of assets is positively correlated with a quantity of days after expiration, which is equivalent to transferring a fine or an interest to the payment platform.

In an implementation, the payment platform can transfer an offchain asset corresponding to the first predetermined duration from the user account corresponding to the vehicle information to the account of the payment platform. In addition, the payment platform can initiate a contract operation used for asset transfer by using a corresponding second blockchain node in the blockchain network. After the contract operation takes effect, transfer can be made from a blockchain asset of the payment platform to a blockchain asset of the parking charging system, and a transferred blockchain asset is equivalent to the offchain asset charged by the account of the payment platform, so that the payment platform makes both ends meet, which is equivalent to the situation that the parking charging system has charged the blockchain asset corresponding to the first predetermined duration from the parked vehicle.

In an implementation, after the parked vehicle in the parking space is detected, the parking charging system can start to record the parking duration of the parked vehicle in the parking space. Each time the parking duration reaches the first predetermined duration, the parking charging system can initiate a contract operation used for asset transfer by using the first blockchain node, where a validation condition of the contract operation includes that the parking duration reaches the first predetermined duration, so that the contract operation can be triggered to take effect. After the contract operation takes effect, the parking charging system can receive, by using the first blockchain node, a blockchain asset corresponding to the first predetermined duration and transferred by the second blockchain node. An offchain asset equivalent to the blockchain asset is deducted from the user account by the payment platform. In other words, the payment platform obtains the offchain asset corresponding to the first predetermined duration from the user account, and transfers the blockchain asset corresponding to the first predetermined duration in the blockchain network, so that the payment platform achieves breakeven, which is equivalent to the situation that the parking charging system has charged the blockchain asset corresponding to the first predetermined duration from the parked vehicle.

In an implementation, after the parked vehicle in the parking space is detected, the parking charging system can start to record the parking duration of the parked vehicle in the parking space. When the parking duration reaches the first predetermined duration, the parking charging system can perform the asset transfer operation related to the payment platform based on the vehicle parking record. After the asset corresponding to the first predetermined duration is charged, the parking charging system can reset the parking duration to recalculate the parking duration. Based on the previous method, the parking duration of the parked vehicle in the parking space can be counted cyclically, so that a corresponding parking fee is collected stage by stage in the parking process. Certainly, in addition to the resetting processing for the parking duration, the parking duration can be counted cyclically by using another method. Methods are not limited in the present specification.

In an implementation, a value of the first predetermined duration can be set based on needs, for example, 30 minutes, 15 minutes, 5 minutes, 1 minute, 10 seconds, or 1 second. The first predetermined duration is set as small as possible, for example, 1 second, and even a similar effect and feeling of "real-time charging" can be generated, so that the parking fee of the parked vehicle can be calculated and collected more accurately.

In an implementation, any type of asset such as cash, a security, and a blockchain asset can be used in the present specification to pay the parking fee, and implementations are not limited in the present specification.

In an implementation, the parking fee can dynamically change. For example, a parking fee within 30 minutes or more than 6 hours is 0 yuan, and a parking fee between 30 minutes and 6 hours is 10 yuan/hour. Therefore, the vehicle parking record can further include total parking duration of the parked vehicle in a parking lot in which the parking space is located, so that the asset corresponding to the first predetermined duration satisfies a charging criterion corresponding to a duration range within which the total parking duration falls.

In an implementation, when the parked vehicle drives away from the parking space, the total parked duration can be reset to terminate the current service for the parked vehicle. Certainly, it can be determined whether the parked vehicle wants to drive away from the parking lot more accurately in another way. Implementations are not limited in the present specification. For example, when the parked vehicle drives away from the parking space and is not parked in any parking space in the parking lot within second predetermined duration, it can be presumed that the parked vehicle certainly wants to drive away from the parking lot, and the total parking duration can be reset. Certainly, the total parking duration can be reset when the parked vehicle drives away from the parking lot.

In an implementation, in addition to the duration range within which the total parking duration falls, the charging criterion may also be related to other factors. The factors are not limited in the present specification. For example, the charging criterion can be further related to a natural day type, and the natural day type can include a workday, a holiday, etc. For another example, the charging criterion can be further related to a time period in a natural day. For example, charging criterion 1 is used for 08:00 to 20:00, and charging criterion 2 is used for 20:00 to 08:00 on the next day.

In an implementation, in the present specification, because the parking charging system can automatically charge a parking fee for a vehicle parked in the parking lot, no blocking facility needs to be disposed at an exit of the parking lot, so that the vehicle can smoothly drive away without stopping. However, it needs to be ensured that a parking fee can be automatically charged by the parking charging system for each vehicle entering the parking lot; otherwise, some parking fees may be neglected. Therefore, when any vehicle drives to an entrance of the parking lot in which the parking space is located, a query request can be initiated to the payment platform based on vehicle information of the any vehicle. When it is determined that a user account corresponding to the vehicle information of the any vehicle exists on the payment platform, it indicates that the parking charging system can automatically charge a parking fee for the any vehicle based on the present specification, and therefore, can allow the any vehicle to pass, so that the any vehicle enters the parking lot; otherwise, the parking charging system refuses the any vehicle to pass.

Figure 3:
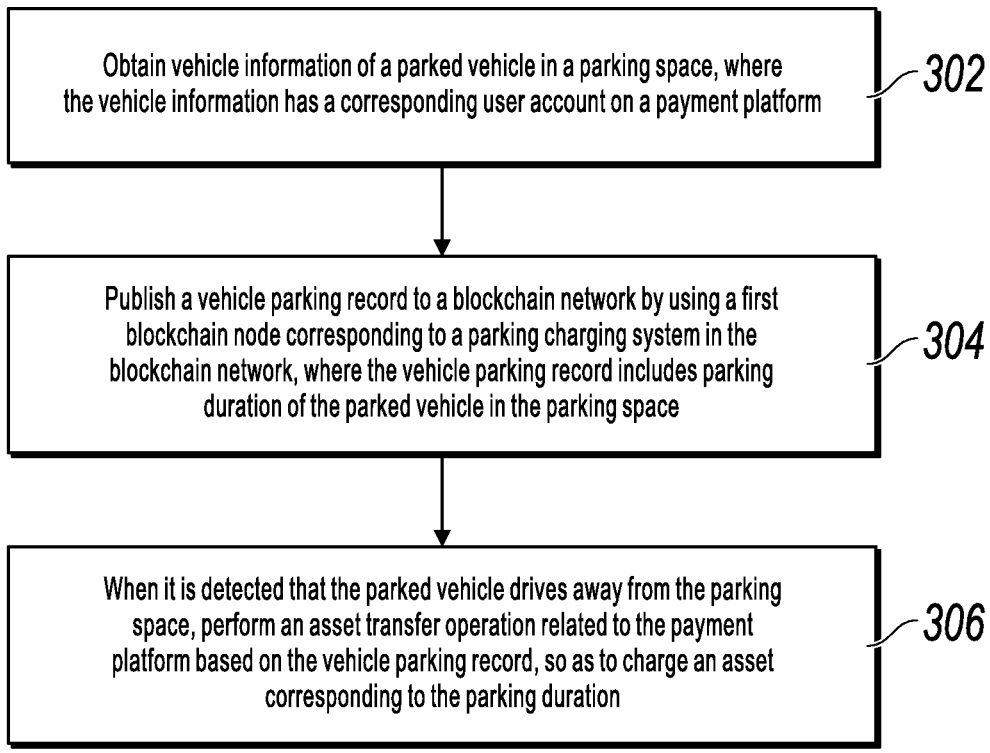
FIG. 3 is a flowchart illustrating another parking charging method, according to an example implementation.

FIG. 3 is a flowchart illustrating another parking charging method, according to an example implementation. As shown in FIG. 3, the method is applied to a parking charging system (e.g., included in the parking charging server 11 shown in FIG. 1), and can include the following steps.

Step 302: Obtain vehicle information of a parked vehicle in a parking space, where the vehicle information has a corresponding user account on a payment platform.

In an implementation, for step 302 and related descriptions, references can be made to step 202 and the related descriptions. Details are omitted here for simplicity.

Step 304: Publish a vehicle parking record to a blockchain network by using a first blockchain node corresponding to the parking charging system in the blockchain network, where the vehicle parking record includes parking duration of the parked vehicle in the parking space.

In an implementation, for step 304 and related descriptions, references can be made to step 204 and the related descriptions. Details are omitted here for simplicity.

Step 306: When it is detected that the parked vehicle drives away from the parking space, perform an asset transfer operation related to the payment platform based on the vehicle parking record, so as to charge an asset corresponding to the parking duration.

In an implementation, after the parked vehicle drives away from the parking space, it takes some time for the vehicle to drive to an exit of a parking lot. Therefore, when it is detected that the parked vehicle drives away from the parking space, the asset transfer operation is performed, so that the parking charging system completes automatic charging of a parking fee in the process that the parked vehicle drives to the exit of the parking lot from the parking space. When the parked vehicle drives to the exit of the parking lot, charging of the parking fee is certainly completed. Therefore, the process that the parked vehicle drives away from the parking lot is not interrupted, so that persons (a driver and a passenger) in the vehicle are unaware of the parking fee payment process, thereby enhancing user experience.

In an implementation, the parking charging system can send an asset transfer request to the payment platform, where the asset transfer request includes a transaction serial number (or other information that uniquely indicates the vehicle parking record) of the vehicle parking record in the blockchain network, so that the payment platform can search a blockchain ledger based on the transaction serial number to determine authenticity and validity of the vehicle parking record. For example, when the payment platform has a corresponding second blockchain node in the blockchain network, the payment platform can view a blockchain ledger maintained by the second blockchain node, to perform verification on a corresponding vehicle parking record. Or, the payment platform can perform verification on a vehicle parking record recorded in a blockchain ledger by using a blockchain node corresponding to another object in the blockchain network.

In an implementation, the asset transfer request can include only the transaction serial number, and the payment platform can calculate a payment amount based on the parking duration included in the vehicle parking record corresponding to the transaction serial number and a predefined charging criterion.

In an implementation, the asset transfer request can include the transaction serial number and a payment amount, and the payment platform can verify whether the payment amount matches the parking duration in the vehicle parking record based on a predefined charging criterion (e.g., 1 yuan/hour), so as to complete the asset transfer only when the payment amount matches the parking duration.

In an implementation, the asset transfer request can include the transaction serial number, a payment amount, and a charging criterion, and the payment platform verifies whether the payment amount matches the parking duration in the vehicle parking record, so as to complete the asset transfer only when the payment amount matches the parking duration.

In an implementation, the payment platform can transfer an offchain asset (i.e., an asset outside the blockchain network, different from a blockchain asset) based on the asset transfer request initiated by the parking charging system. For example, when the vehicle information has a corresponding user account on the payment platform, the payment platform can directly transfer the corresponding asset from the user account to an account of the parking charging system on the payment platform. For another example, when a credit limit of the user account is not exceeded, the charged asset corresponding to the parking duration comes from a credit asset related to the user account. For example, the payment platform can transfer the corresponding asset from an account of the payment platform to an account of the parking charging system on the payment platform, regardless of whether the user account has sufficient assets. Subsequently, an owner of the user account can transfer the asset advanced by the payment platform to the account of the payment platform at any time within a predetermined time period. Otherwise, the owner needs to transfer more assets to the account of the payment platform after the predetermined time period expires, and the amount of assets is positively correlated with a quantity of days after expiration, which is equivalent to transferring a fine or an interest to the payment platform.

In an implementation, the payment platform can transfer an offchain asset corresponding to the parking duration from the user account corresponding to the vehicle information to the account of the payment platform. In addition, the payment platform can initiate a contract operation used for asset transfer by using a corresponding second blockchain node in the blockchain network. After the contract operation takes effect, transfer can be made from a blockchain asset of the payment platform to a blockchain asset of the parking charging system, and a transferred blockchain asset is equivalent to the offchain asset charged by the account of the payment platform, so that the payment platform makes both ends meet, which is equivalent to the situation that the parking charging system has charged the blockchain asset corresponding to the parking duration from the parked vehicle.

In an implementation, after the parked vehicle in the parking space is detected, the parking charging system can start to record the parking duration of the parked vehicle in the parking space. When it is detected that the parked vehicle drives away from the parking space, the parking charging system can initiate a contract operation used for asset transfer by using the first blockchain node. After the contract operation takes effect, the parking charging system can receive, by using the first blockchain node, a blockchain asset corresponding to the parking duration and transferred by the second blockchain node. An offchain asset equivalent to the blockchain asset is deducted from the user account by the payment platform. In other words, the payment platform obtains the offchain asset corresponding to the parking duration from the user account, and transfers the blockchain asset corresponding to the parking duration in the blockchain network, so that the payment platform achieves breakeven, which is equivalent to the situation that the parking charging system has charged the blockchain asset corresponding to the parking duration from the parked vehicle.

In an implementation, any type of asset such as cash, a security, and a blockchain asset can be used in the present specification to pay the parking fee, and implementations are not limited in the present specification.

In an implementation, the parking fee can dynamically change. For example, a parking fee within 30 minutes or more than 6 hours is 0 yuan, and a parking fee between 30 minutes and 6 hours is 10 yuan/hour. Therefore, the asset corresponding to the parking duration satisfies a charging criterion corresponding to a duration range within which the parking duration falls.

In an implementation, when the parked vehicle drives away from the parking space, the parked duration can be reset to terminate the current service for the parked vehicle. Certainly, it can be determined whether the parked vehicle wants to drive away from the parking lot more accurately in another way. Implementations are not limited in the present specification. For example, when the parked vehicle drives away from the parking space and is not parked in any parking space in the parking lot within second predetermined duration, it can be presumed that the parked vehicle certainly wants to drive away from the parking lot, and the parking duration can be reset. Certainly, the parking duration can be reset when the parked vehicle drives away from the parking lot.

In an implementation, in addition to the duration range within which the parking duration falls, the charging criterion may also be related to other factors. The factors are not limited in the present specification. For example, the charging criterion can be further related to a natural day type, and the natural day type can include a workday, a holiday, etc. For another example, the charging criterion can be further related to a time period in a natural day. For example, charging criterion 1 is used for 08:00 to 20:00, and charging criterion 2 is used for 20:00 to 08:00 on the next day.

In an implementation, in the present specification, because the parking charging system can automatically charge a parking fee for a vehicle parked in the parking lot, no blocking facility needs to be disposed at an exit of the parking lot, so that the vehicle can smoothly drive away without stopping. However, it needs to be ensured that a parking fee can be automatically charged by the parking charging system for each vehicle entering the parking lot; otherwise, some parking fees may be neglected. Therefore, when any vehicle drives to an entrance of the parking lot in which the parking space is located, a query request can be initiated to the payment platform based on vehicle information of the any vehicle. When it is determined that a user account corresponding to the vehicle information of the any vehicle exists on the payment platform, it indicates that the parking charging system can automatically charge a parking fee for the any vehicle based on the present specification, and therefore, can allow the any vehicle to pass, so that the any vehicle enters the parking lot; otherwise, the parking charging system refuses the any vehicle to pass.

Figure 4:
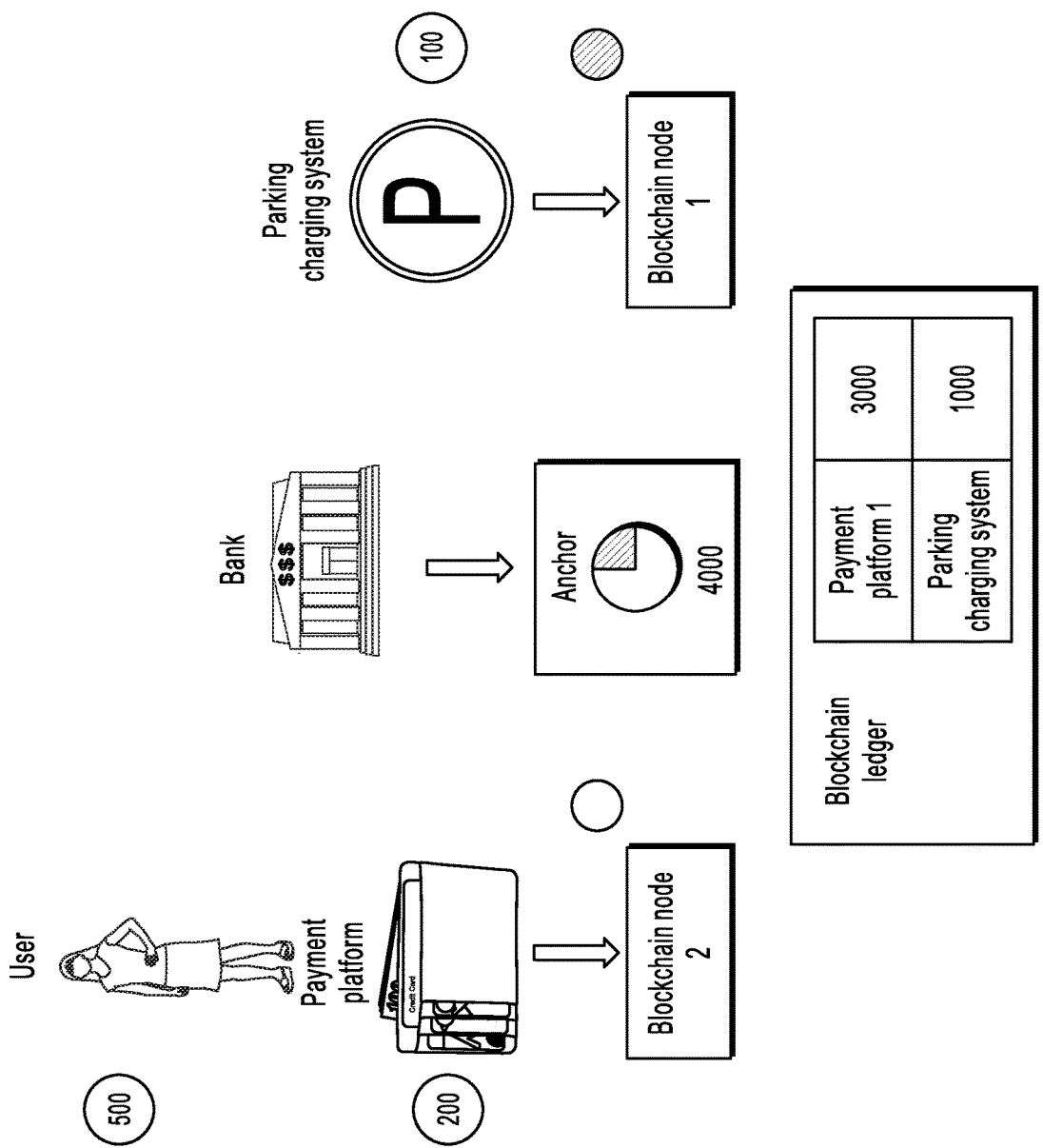
FIG. 4 is a schematic diagram illustrating a parking lot automatic charging scenario, according to an example implementation.

For ease of understanding, technical solutions of one or more implementations of the present specification are described by using "parking lot automatic charging" as an example. FIG. 4 is a schematic diagram illustrating a parking lot automatic charging scenario, according to an example implementation. As shown in FIG. 4, assume that a parking charging system is configured in a parking lot, and the parking charging system creates account 1 on a payment platform. For example, a balance of account 1 in FIG. 4 is 100 yuan. A user can also create account 2 on the payment platform. For example, a balance of account 2 in FIG. 4 is 500 yuan. The payment platform can also create an account of the payment platform. For example, a balance of the account of the payment platform is 200 yuan in FIG. 4. Both the parking charging system and the payment platform can be blockchain members (or referred to as members) in a blockchain network. For example, the parking charging system corresponds to blockchain node 1 in the blockchain network, and the payment platform corresponds to blockchain node 2 in the blockchain network, so that the parking charging system and the payment platform can perform operations such as asset transfer in the blockchain network based on blockchain nodes 1 and 2, respectively. Blockchain nodes in the blockchain network can include an anchor in addition the previous blockchain members. A role of the anchor can be assumed by a blockchain member, or the anchor can be unrelated to a blockchain member. In other words, the role of the anchor does not have to be assumed by a blockchain member. For example, in the implementation shown in FIG. 4, a bank can assume the role of the anchor, and the bank may be a blockchain member, or does not have to be a blockchain member.

The anchor is configured to anchor a blockchain asset in the blockchain network to an offchain asset outside the blockchain network, so that an offchain asset can be converted into an equivalent blockchain asset by using the anchor, or a blockchain asset can be converted into an equivalent offchain asset by using the anchor, thereby implementing one-to-one mapping between blockchain assets and offchain assets. In addition, the anchor can register, in a blockchain ledger in the blockchain network, a blockchain asset (or referred to as a blockchain balance) deposited by each blockchain member in the anchor, so as to maintain a holding status of each blockchain member for the blockchain asset. For example, in the implementation shown in FIG. 4, assume that a blockchain asset that the parking charging system registers with the anchor by using blockchain node 1 is 1000 yuan, and a blockchain asset that the payment platform registers with the anchor by using blockchain node 2 is 3000 yuan.

Figure 5:
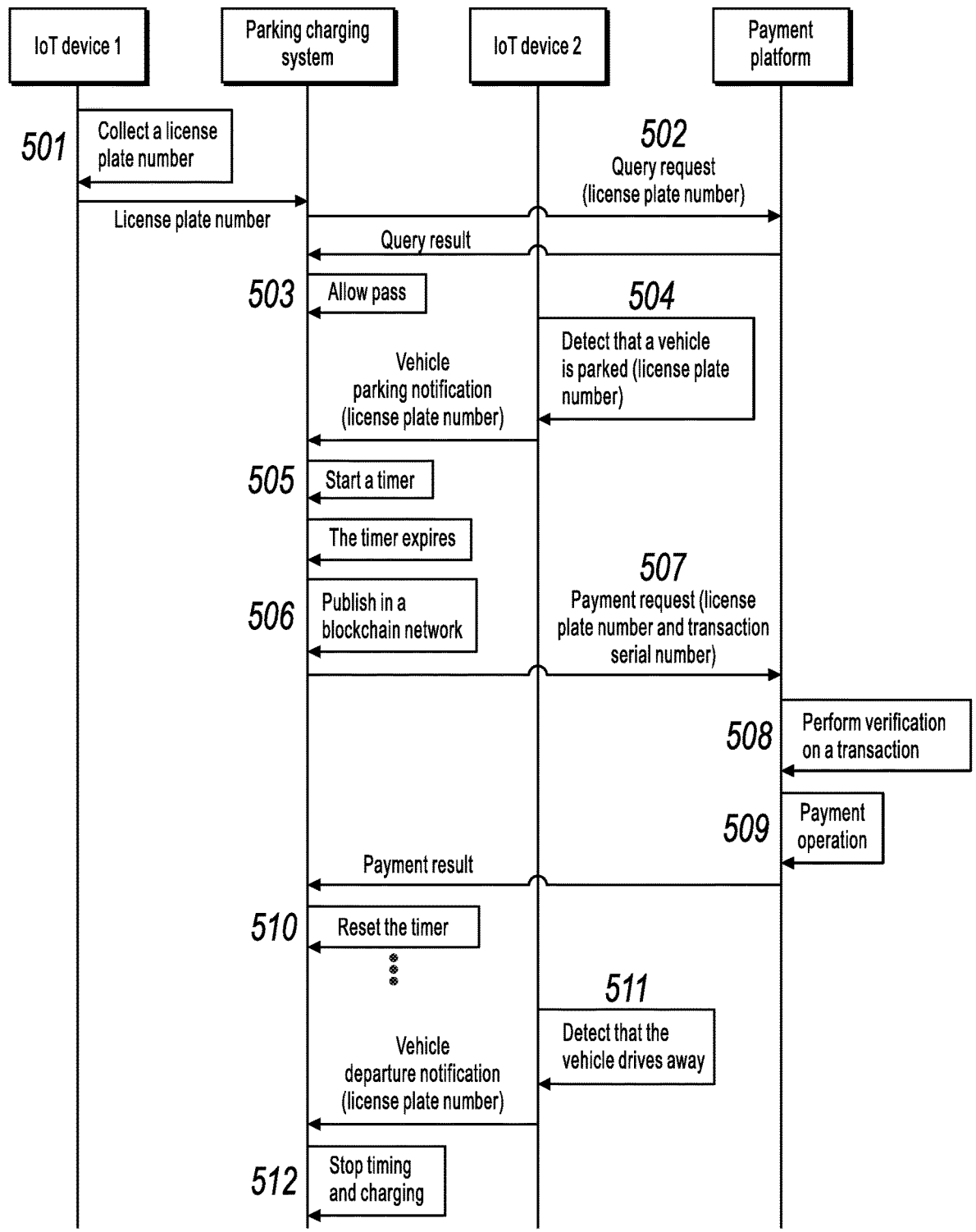
FIG. 5 is a schematic interaction diagram illustrating automatic parking lot charging, according to example implementation 1.

For the scenario shown in FIG. 4, FIG. 5 is a schematic interaction diagram illustrating parking lot automatic charging, according to example implementation 1. As shown in FIG. 5, assume that the previously described parking charging system and IoT device 1 and IoT device 2 that are associated with the parking charging system are configured in a parking lot. The parking charging system can automatically charge a parking fee based on detection data of IoT device 1 and IoT device 2 in cooperation with a payment platform. The interaction process of the parking lot automatic charging can include the following steps.

Step 501: IoT device 1 collects a license plate number, and sends the license plate number to the parking charging system.

In an implementation, assume that IoT device 1 is disposed at an entrance of the parking lot, and is configured to detect vehicle information of a vehicle that wants to enter the parking lot. For example, the vehicle information can include a license plate number.

In an implementation, IoT device 1 can include any electronic device capable of collecting vehicle information of a vehicle. A license plate number is used as an example. For example, IoT device 1 can be an image collection device, and an image collected by the image collection device for a vehicle can be used to identify the license plate number. For another example, IoT device 1 can be an RFID reader, the RFID reader can read an RFID signal transmitted by an RFID tag installed on a vehicle, and the RFID signal can include a license plate number of the corresponding vehicle.

In an implementation, IoT device 1 can use vehicle information of other types other than the license plate number, or combine the license plate number with vehicle information of another type, so as to reduce possible abnormal situations of vehicles, for example, "vehicle cloning", and prevent a loss to a cloned vehicle.

Step 502: The parking charging system sends a query request to the payment platform, where the query request includes the license plate number of the vehicle, and receives a query result returned by the payment platform.

Step 503: When the query result is that a user account corresponding to the license plate number exists on the payment platform, allow the corresponding vehicle to pass, so that the vehicle enters the parking lot.

In an implementation, a driver of the vehicle or another associated user needs to preset a corresponding user account on the payment platform, and binds the user account to the license plate number of the vehicle, etc. Based on a binding relationship between the user account and the license plate number, the payment platform can detect the license plate number provided by the parking charging system to determine whether the corresponding user account exists. For example, when the license plate number is "A12345", assuming that the payment platform can identify that the bound user account is account 1, the payment platform can return a query result of "an account is bound"; or assuming that the payment platform does not identify a bound user account, the payment platform can return a query result of "no account is bound".

In an implementation, in the present specification, a parking fee of a vehicle is automatically charged by the parking charging system. Therefore, no blocking apparatus such as a parking barrier needs to be disposed at an exit of the parking lot, so that the vehicle can drive away from the parking lot directly and smoothly without staying at the exit for payment, etc. Therefore, through steps 501 to 503, before a vehicle enters the parking lot, it can be determined that the vehicle has a corresponding user account on the payment platform, so as to ensure that the vehicle can support the technical solution of the present specification and that the parking charging system can automatically charge a parking fee based on the user account. A vehicle that cannot support the technical solution of the present specification should be prohibited from passing because a parking fee cannot be charged for the related vehicle by the parking charging system and the vehicle cannot stay at the exit for payment. Therefore, the parking fee cannot be successfully charged.

Step 504: After detecting that a vehicle is parked in a parking space, IoT device 2 sends a corresponding vehicle parking notification to the parking charging system, where the vehicle parking notification includes a license plate number of the related vehicle obtained by IoT device 2.

In an implementation, IoT device 2 can include any electronic device capable of detecting that a vehicle is parked in a parking space and obtaining a license plate number of the vehicle. Implementations are not limited in the present specification.

In an implementation, IoT device 2 can be a monitoring device. The monitoring device can monitor one or more parking spaces in the parking lot. The monitoring device can analyze whether a vehicle is parked in a parking space by using a monitoring image, and analyze a license plate number of the vehicle from the monitoring image.

In an implementation, IoT device 2 can be an RFID reader. One RFID reader can be disposed for each parking space in the parking lot, and a valid reading range of the RFID reader does not go beyond the corresponding parking space. Therefore, when a vehicle enters a parking space, only an RFID reader disposed at the parking space can activate an RFID tag on the vehicle. In this case, it can be detected that the vehicle is parked in the parking space. In addition, the RFID reader can read an RFID signal transmitted by the RFID tag, and the RFID signal can include a license plate number of the vehicle on which the RFID tag is located.

The "activating an RFID tag" refers to the situation that the RFID tag is of a passive type. In other situations, the RFID tag on the vehicle can be of an active type, so that the RFID tag can actively transmit the RFID signal without being "activated". Transmit power of the RFID tag is limited and a transmit range of the RFID signal is controlled, so that the RFID reader can also determine that the vehicle is parked in the corresponding parking space based on the received RFID signal and determine the license plate number of the parked vehicle.

In an implementation, whether a vehicle is parked in a parking space can be identified and vehicle information of the vehicle can be obtained only by using IoT device 2, so that the parking charging system can further automatically charge a parking fee based on a vehicle parking notification sent by IoT device 2. However, in some situations, "identifying whether a vehicle is parked in a parking space" and "obtaining vehicle information of the vehicle" can be completed by different IoT devices, so as to reduce requirements on aspects such as performance for each IoT device.

In an implementation, IoT device A can "identify whether a vehicle is parked in a parking space" and IoT device B can "obtain vehicle information of the vehicle". When it is detected that a vehicle is parked in a parking space, IoT device A sends a vehicle parking notification to the parking charging system. The parking charging system sends a vehicle information request to IoT device B, and IoT device B collects a license plate number and notifies the parking charging system of the license plate number.

In an implementation, IoT device A can include any IoT device capable of sensing a vehicle parked in a parking space. Implementations are not limited in the present specification. In an implementation, IoT device A can include an underground induction coil, and the underground induction coil can be installed under the ground of the parking space or at another location, so that the vehicle entering the parking space can trigger the underground induction coil. In an implementation, IoT device A can include a ranging device, the ranging device can be installed above the parking space or at another location for ranging toward the ground of the parking space, and the vehicle entering the parking space can trigger a change of a ranging result of the ranging device. In an implementation, IoT device A can include an infrared detection device, the infrared detection device can be installed above or in front of the parking space or at another location, and the vehicle entering the parking space can trigger the infrared detection device to generate a predetermined infrared detection result. In an implementation, IoT device A can include a monitoring device. The monitoring device can monitor one or more parking spaces in the parking lot. The monitoring device can analyze whether a vehicle is parked in a parking space by using a monitoring image.

In an implementation, IoT devices A can be in a one-to-one correspondence with parking spaces, so that after receiving a vehicle parking notification sent by any IoT device A, the parking charging system can use a parking space corresponding to IoT device A as a parking space in which a vehicle is parked. In an implementation, IoT device A can monitor multiple parking spaces at the same time. When it is detected that a vehicle is parked in a parking space, IoT device A does not need to determine the exact parking space in which the vehicle is parked. After the parking charging system initiates the vehicle information request to IoT device B, IoT device B can detect all parking spaces corresponding to IoT device A, and determine the parking space in which the vehicle is parked through analysis. In an implementation, IoT device A can monitor multiple parking spaces at the same time. When it is detected that a vehicle is parked in a parking space, IoT device A can obtain identification information of the parking space, for example, a parking space number, include the identification information in a vehicle parking notification, and send the vehicle parking notification to the parking charging system, so that the parking charging system instructs IoT device B to detect a parking space corresponding to the identification information, so as to identify a license plate number of the vehicle parked in the parking space.

In an implementation, IoT device B can include any electronic device capable of obtaining a license plate number of a vehicle parked in a parking space. Implementations are not limited in the present specification. In an implementation, IoT device B can be a monitoring device. The monitoring device can monitor at least some parking spaces monitored by IoT device A. The monitoring device can identify a license plate number of a vehicle through analysis on a monitoring image. In an implementation, IoT device B can be an RFID reader. A signal transceiving range of the RFID reader can cover at least some parking spaces monitored by IoT device A, so that when IoT device A detects a vehicle parked in a parking space, the RFID reader can receive an RFID signal sent by an RFID tag installed on the vehicle, and read a license plate number of the vehicle included in the RFID signal.

Step 505: The parking charging system starts a timer to record parking duration of the related vehicle based on the vehicle parking notification sent by IoT device 2.

In an implementation, assuming that a license plate number included in the vehicle parking notification is "A12345", the parking charging system can start corresponding timer 1 for "A12345", and timer 1 is dedicated to recording parking duration of the vehicle "A12345".

In an implementation, timer 1 can have any predefined duration, for example, 1 hour, 30 minutes, 5 minutes, 1 minute, or 3 seconds. Implementations are not limited in the present specification.

Step 506: After the timer expires, the parking charging system publishes the parking duration of the related vehicle to a blockchain network.

In an implementation, assuming that expiration duration predetermined for timer 1 is 1 hour, after timer 1 expires, the parking charging system can publish, to the blockchain network by using blockchain node 1, situations, for example, the parking duration of the vehicle "A12345" is 1 hour, so that information about the parking duration is recorded in a transaction record in a blockchain ledger. The transaction record can be uniquely mapped by using a corresponding transaction serial number, etc.

Step 507: The parking charging system initiates a payment request to the payment platform, where the payment request includes the license plate number and a transaction serial number.

Step 508: The payment platform performs verification on a related transaction for the payment request.

Step 509: The payment platform triggers a payment operation.

In an implementation, the payment platform can identify that the bound user account is account 2 based on the license plate number "A12345", so as to perform a payment operation for account 2.

In an implementation, the payment platform can identify a corresponding transaction record from the blockchain ledger by using blockchain node 2 based on the transaction serial number included in the payment request. Therefore, it can be verified that the parking charging system actually obtains the parking duration of the vehicle "A12345". In addition, a specific value of the parking duration corresponding to the vehicle "A12345" can be determined. A blockchain is resistant to modification to information and is traceable, so that information registered in the blockchain ledger has enough reliability, and can be trusted by each member and anchor, and therefore, can be used as the basis for performing a payment operation by the payment platform.

In an implementation, the payment request does not have to include a specific payment amount, and the payment platform calculates a corresponding payment amount based on the parking duration recorded in the transaction record and a charging rule pre-agreed between the parking charging system and the payment platform. For example, assume that expiration duration of the timer is 1 hour, and the parking duration recorded in the transaction record is 1 hour. If the charging rule is 8 yuan/hour, the payment platform can calculate that a corresponding payment amount is 8 yuan.

In an implementation, the payment request can include a specific payment amount. For example, the parking charging system can calculate that the payment amount is 8 yuan based on the parking duration "1 hour" of the vehicle "A12345" and a charging rule "8 yuan/hour", and add a value of the payment amount to the payment request. In this case, the payment platform can determine, from the transaction record in the blockchain network, that the parking duration of the vehicle "A12345" is 1 hour and the predefined charging rule is 8 yuan/hour. Therefore, the payment platform calculates that the payment amount is 8 yuan. In addition, the payment platform can read the payment amount "8 yuan" from the payment request. If the two are consistent, the payment operation can be successfully performed. Otherwise, the payment platform can refuse to perform the payment operation.

Figure 6:
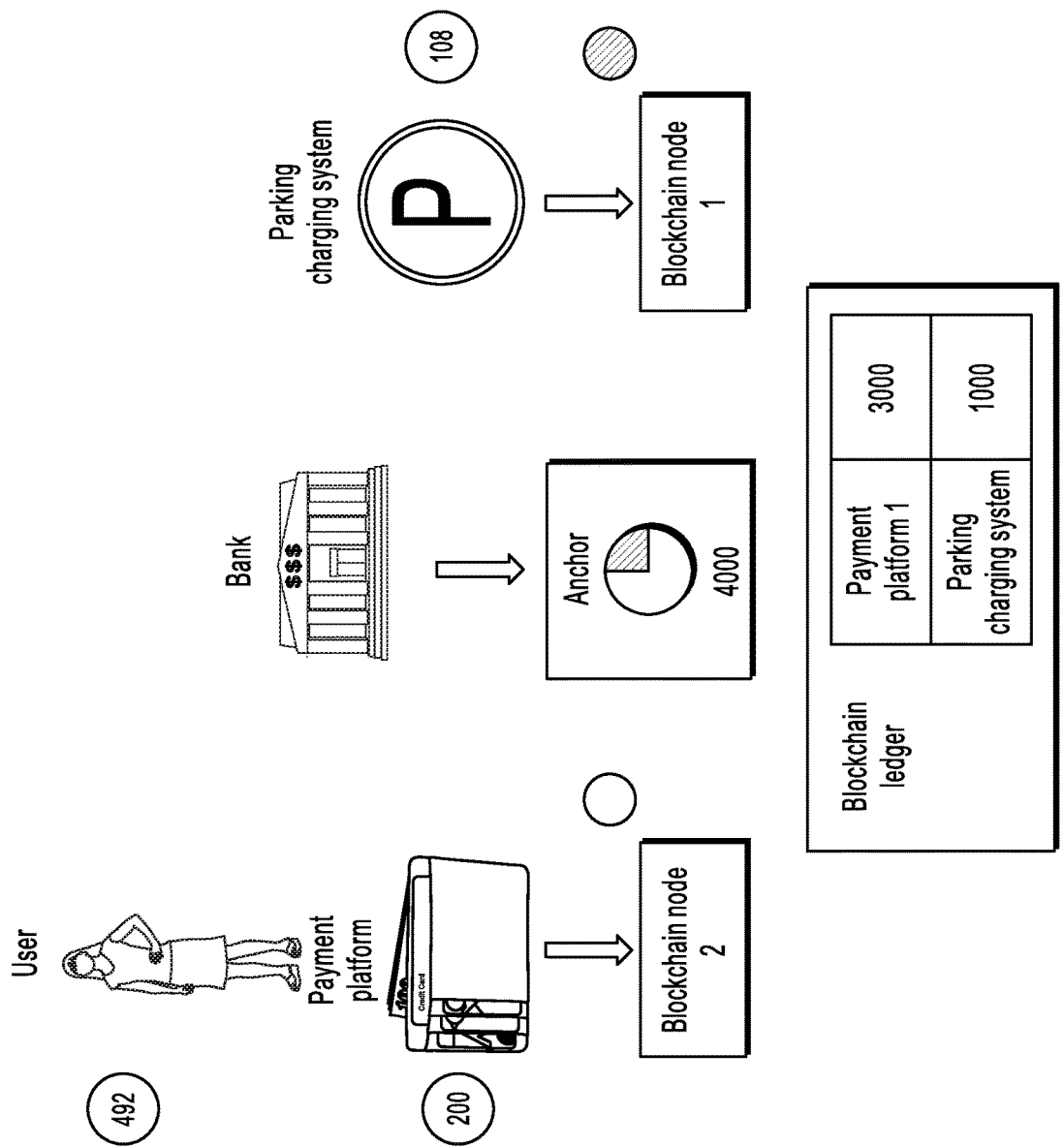
FIG. 6 is a schematic diagram illustrating a payment operation, according to an example implementation.

FIG. 6 is a schematic diagram illustrating a payment operation, according to an example implementation. As shown in FIG. 6, because the parking charging system has corresponding account 1 on the payment platform, and the vehicle "A12345" corresponds to account 2 on the payment platform, the payment platform can transfer an asset corresponding to the previously described payment amount from account 2 to account 1, so as to complete automatic charging of the parking fee. For example, when the payment amount is 8 yuan, a balance of account 1 is increased from 100 yuan in FIGS. 4 to 108 yuan in FIG. 6, and a balance of account 2 is decreased from 500 yuan in FIGS. 4 to 492 yuan in FIG. 6.

Figure 7:
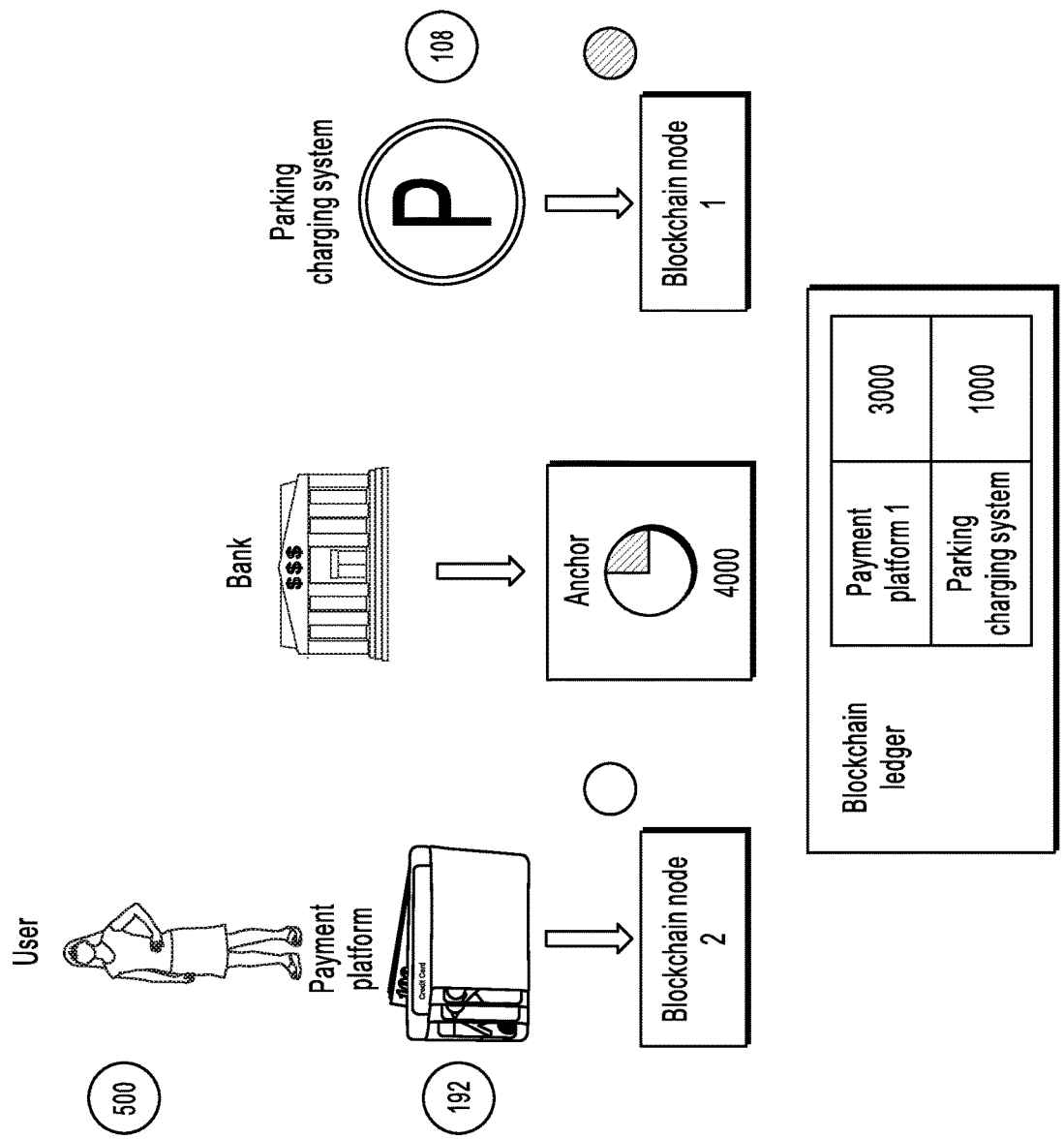
FIG. 7 is a schematic diagram illustrating another payment operation, according to an example implementation.

FIG. 7 is a schematic diagram illustrating another payment operation, according to an example implementation. As shown in FIG. 7, if account 2 has a credit limit on the payment platform, and the remaining credit limit is not less than the payment amount, the payment platform can transfer a fund corresponding to the payment amount from an account of the payment platform (or another account such as a credit dedicated account) to account 1, and deduct the payment amount from the credit limit corresponding to account 2. In this case, even if remaining funds of account 2 are insufficient to pay the payment amount, the parking charging system can still charge the corresponding parking fee. For example, when the payment amount is 8 yuan, a balance of account 1 is increased from 100 yuan in FIGS. 4 to 108 yuan in FIG. 7, a balance of account 2 remains unchanged at 500 yuan, and a balance of the account of the payment platform is decreased from 200 yuan in FIGS. 4 to 192 yuan in FIG. 7. Therefore, account 2 does not need to pay the parking fee of the vehicle "A12345" immediately, but can return the payment amount advanced by the account of the payment platform after a certain period of time. In this case, even if account 2 may have insufficient funds due to various reasons, the parking fee can be paid based on the credit limit of account 2 on the payment platform.

Figure 8:
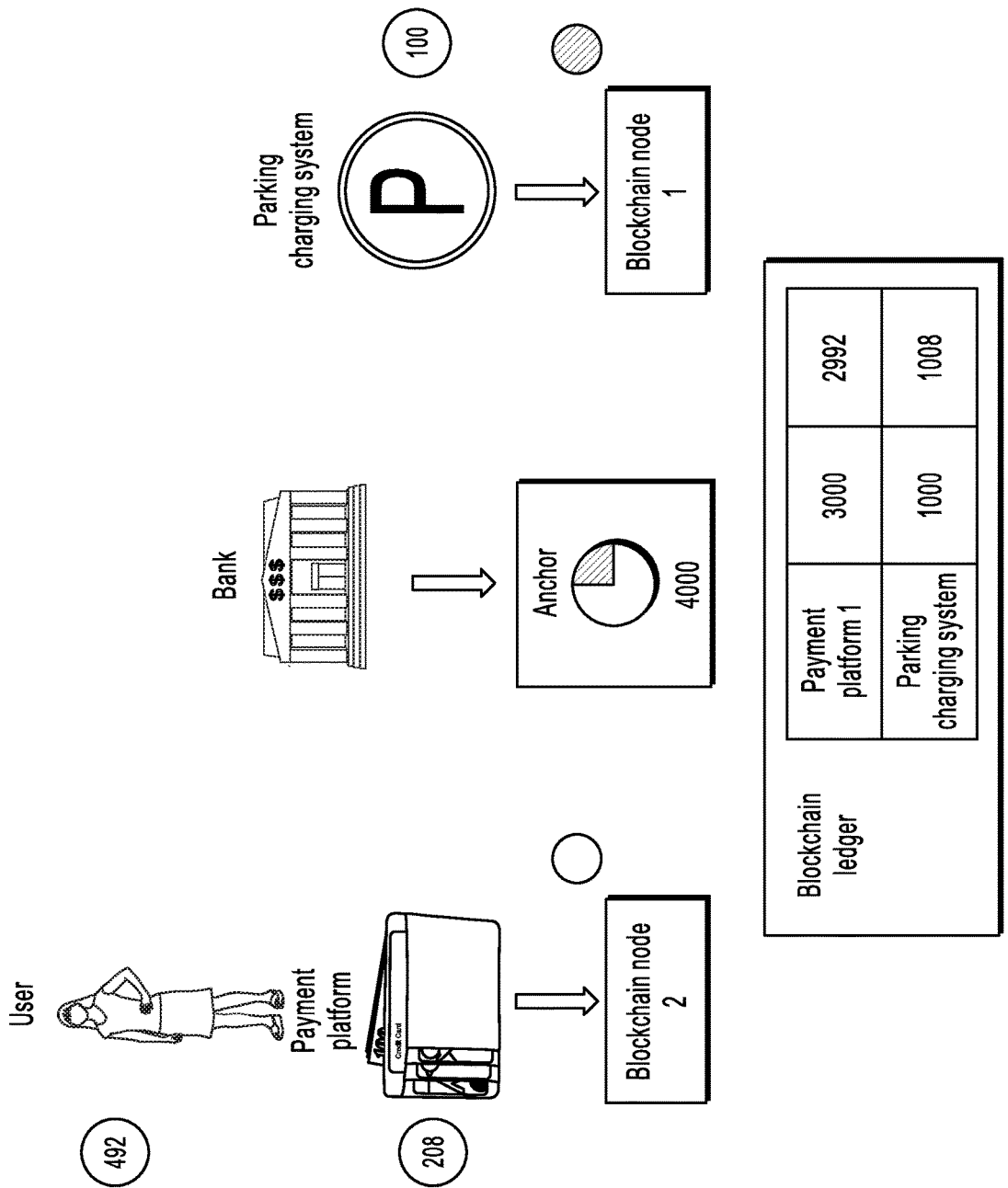
FIG. 8 is a schematic diagram illustrating still another payment operation, according to an example implementation.

In the implementations shown in FIG. 6 and FIG. 7, the parking fee payment operation is completed by transferring an offchain asset based on account 1, account 2, the account of the payment platform, etc. that are opened on the payment platform. In other implementations, the parking fee payment operation can be performed by transferring a blockchain asset. The following provides descriptions with reference to FIG. 8. As shown in FIG. 8, the payment platform first deducts an offchain asset corresponding to the payment amount from account 2 corresponding to the vehicle "A12345", for example, transfers 8 yuan from account 2 to the account of the payment platform, so that a balance of account 2 is decreased from 500 yuan in FIGS. 4 to 492 yuan in FIG. 8, and a balance of the account of the payment platform is increased from 200 yuan in FIGS. 4 to 208 yuan in FIG. 8. Transfer is made from a blockchain asset deposited by the payment platform in an anchor to a blockchain asset deposited by the parking charging system in the anchor. Assuming that a conversion ratio between a blockchain asset and an offchain asset is 1:1, 8 yuan is transferred from the blockchain asset corresponding to the payment platform to the blockchain asset corresponding to the parking charging system, so that the blockchain asset corresponding to the payment platform is decreased from 3000 yuan in FIGS. 4 to 2992 yuan in FIG. 8, and the blockchain asset corresponding to the parking charging system is increased from 1000 yuan in FIGS. 4 to 1008 yuan in FIG. 8. In this case, in view of the transfer of the offchain asset and the blockchain asset, the payment platform achieves a balance between the received offchain asset and the transferred blockchain asset, which is equivalent to the situation that account 2 corresponding to the vehicle "A12345" pays the offchain asset corresponding to the payment amount and the parking charging system receives the blockchain asset corresponding to the payment amount, thereby completing automatic charging of the parking fee.

Certainly, in the implementation shown in FIG. 8, the payment platform and the parking charging system have blockchain assets at the same anchor, and a payment condition of the payment amount is satisfied. The payment condition can include the following: (1) The blockchain asset corresponding to the payment platform is not less than the payment amount, for example, 3000>8. (2) The parking charging system presets a maximum asset limit for the anchor, and the sum (e.g., 1008 yuan) of the payment amount and the blockchain asset of the parking charging system is not greater than the maximum asset limit (e.g., 3000 yuan). Therefore, the blockchain asset transfer operation can be successfully performed.

In other situations, for example, if the payment platform and the parking charging system do not have blockchain assets at the same anchor, or the previously described payment condition cannot be satisfied although the payment platform and the parking charging system have blockchain assets at the same anchor, relaying can be performed by using another blockchain member and anchor, so as to implement blockchain asset transfer. For example, assume that a blockchain asset deposited by the payment platform in anchor 1 is 3000 yuan, a blockchain asset deposited by bank X in anchor 1 is 1000 yuan, a maximum asset limit set by bank X for anchor 1 is 1500 yuan, a blockchain asset deposited by bank X in anchor 2 is 2000 yuan, a blockchain asset deposited by the parking charging system in anchor 2 is 1000 yuan, a maximum asset limit set by the parking charging system for anchor 2 is 2000 yuan, and there can also be other anchors, blockchain members, etc. In this case, when the payment amount is 8 yuan, a blockchain asset transfer path "payment platform→bank X→parking charging system" can be identified. Asset transfer is made from the blockchain asset 3000 yuan deposited by the payment platform in anchor 1 to the blockchain asset 1000 yuan deposited by bank X in anchor 1, and a transfer amount is a blockchain asset 8 yuan corresponding to the payment amount. In addition, asset transfer is made from the blockchain asset 2000 yuan deposited by bank X in anchor 2 to the blockchain asset 1000 yuan deposited by the parking charging system in anchor 2, and a transfer amount is the blockchain asset 8 yuan corresponding to the payment amount. Therefore, the payment platform has transferred the blockchain asset 8 yuan corresponding to the payment amount to the parking charging system. In addition to performing relaying by using the blockchain member "bank X", relaying can be performed by using more blockchain members. Details are omitted here for simplicity.

It is worthwhile to note that, when blockchain asset transfer is being made by using one or more relays, because blockchain nodes maintain blockchain ledgers with the same content, and the blockchain ledger records a blockchain asset deposited by each blockchain member in each anchor, adjustment to blockchain assets deposited by the blockchain members can be made in the blockchain network together. For example, in the previously described implementation, the blockchain asset deposited by the payment platform in anchor 1, the blockchain asset deposited by bank X in anchor 1, the blockchain asset deposited by bank X in anchor 2, and the blockchain asset deposited by the parking charging system in anchor 2 are adjusted together, so that following situations occur at the same time: The blockchain asset deposited by the payment platform in anchor 1 is decreased by 8 yuan, the blockchain asset deposited by bank X in anchor 1 is increased by 8 yuan, the blockchain asset deposited by bank X in anchor 2 is decreased by 8 yuan, and the blockchain asset deposited by the parking charging system in anchor 2 is increased by 8 yuan, so that asset transfer efficiency is significantly improved.

In an implementation, the payment operation shown in FIG. 8 is performed by the payment platform in step 509. Therefore, when blockchain asset transfer is involved, the payment platform can initiate a contract operation used for asset transfer in the blockchain network by using corresponding blockchain node 2 in the blockchain network, so that after the contract operation takes effect, the blockchain asset transfer is made.

Step 510: When a received payment result is that the payment succeeds, the parking charging system controls the corresponding timer to reset.

In an implementation, after completing the payment operation, the payment platform returns the corresponding payment result to the parking charging system. Assuming that the payment result indicates that the parking fee is successfully charged for the vehicle whose license plate number is "A12345", and the parking charging system can reset timer 1 corresponding to "A12345", so that the parking charging system recounts the parking duration of the vehicle "A12345".

Therefore, in the process that the vehicle is parked in the parking space, steps 505 to 510 can be repeatedly triggered, so that the parking charging system cooperates with the payment platform, to charge the parking fee automatically, continually, and stage by stage until the vehicle drives away from the parking lot.

Step 511: After detecting that the vehicle drives away, IoT device 2 sends a corresponding vehicle departure notification to the parking charging system, where the vehicle departure notification includes the license plate number of the related vehicle obtained by IoT device 2.

In an implementation, IoT device 2 can continuously detect the vehicle in the parking space to determine whether the vehicle drives away from the parking space.

In an implementation, IoT device 2 can be a monitoring device. The monitoring device can monitor one or more parking spaces in the parking lot. The monitoring device can analyze whether a vehicle drives away from a parking space by using a monitoring image, and analyze a license plate number of the vehicle from the monitoring image.

In an implementation, IoT device 2 can be an RFID reader. One RFID reader can be disposed for each parking space in the parking lot, and a valid reading range of the RFID reader does not go beyond the corresponding parking space. The RFID reader can perform a read operation based on a predetermined cycle, so that when a vehicle is parked in a parking space, an RFID tag on the vehicle can correspondingly send an RFID signal to the RFID reader. When the RFID reader cannot read an RFID signal in n consecutive (n is a predetermined value, e.g., n=3) cycles, or when the RFID signal read by the RFID reader changes, it can be determined that the originally parked vehicle has driven away from the corresponding parking space.

In an implementation, in step 504, IoT device 2 can report parking space information of the parked vehicle (e.g., add a parking space number to the vehicle parking notification) to the parking charging system, so that the parking charging system can associate the parking space information with the license plate number. In addition, in step 511, IoT device 2 can add corresponding parking space information only to the vehicle departure notification, so that the parking charging system determines an associated license plate number based on the parking space information.

Step 512: The parking charging system stops timing and charging for the parking duration of the vehicle that has driven away.

In an implementation, assuming that the license plate number included in the vehicle departure notification received by the parking charging system is "A12345", the parking charging system can terminate timer 1 corresponding to "A12345", so as to stop charging the vehicle "A12345".

In an implementation, in the process that the vehicle "A12345" is parked in the parking space, the parking charging system has charged the corresponding parking fee in cooperation with the payment platform, and it has been verified in steps 501 to 503 that the vehicle "A12345" can support the technical solution of the present specification. Therefore, when the vehicle "A12345" drives away from the parking space, it is assumed by default that the parking fee is actually paid by the vehicle "A12345". Therefore, the vehicle "A12345" can directly drive away from the exit of the parking lot, and there is no need to dispose any facility that may impede or hinder the driving, for example, a railing, at the exit. Therefore, it is ensured that the vehicle "A12345" can drive away from the exit of the parking lot smoothly and without interruption, thereby enhancing user experience and maintaining driving safety and driving order in the parking lot.

Figure 9:
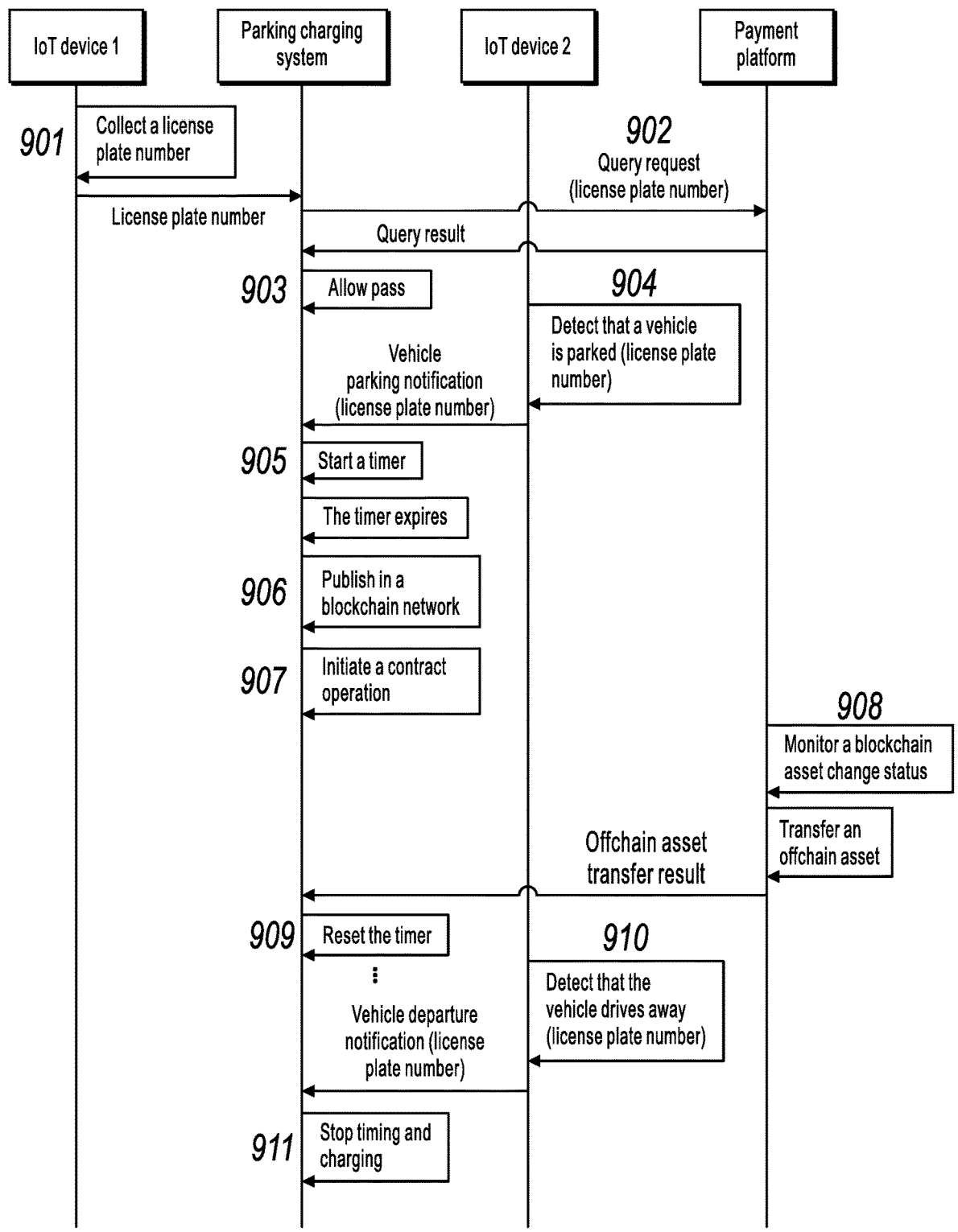
FIG. 9 is a schematic interaction diagram illustrating another type of parking lot automatic charging, according to example implementation 1.

In the implementation shown in FIG. 5, the contract operation can be initiated by the payment platform in the blockchain network to complete the corresponding payment operation. In other implementations, the parking charging system can further initiate the contract operation in the blockchain network. The following provides descriptions with reference to FIG. 9. FIG. 9 is a schematic interaction diagram illustrating another type of parking lot automatic charging, according to example implementation 1. As shown in FIG. 9, assume that the previously described parking charging system and IoT device 1 and IoT device 2 that are associated with the parking charging system are configured in a parking lot. The parking charging system can automatically charge a parking fee based on detection data of IoT device 1 and IoT device 2 in cooperation with a payment platform. The interaction process of the parking lot automatic charging can include the following steps.

Step 901: IoT device 1 collects a license plate number, and sends the license plate number to the parking charging system.

Step 902: The parking charging system sends a query request to the payment platform, where the query request includes the license plate number of the vehicle, and receives a query result returned by the payment platform.

Step 903: When the query result is that a user account corresponding to the license plate number exists on the payment platform, allow the corresponding vehicle to pass, so that the vehicle enters the parking lot.

Step 904: After detecting that a vehicle is parked in a parking space, IoT device 2 sends a corresponding vehicle parking notification to the parking charging system, where the vehicle parking notification includes a license plate number of the related vehicle obtained by IoT device 2.

Step 905: The parking charging system starts a timer to record parking duration of the related vehicle based on the vehicle parking notification sent by IoT device 2.

Step 906: After the timer expires, the parking charging system publishes the parking duration of the related vehicle to a blockchain network.

In an implementation, for steps 901 to 906, references can be made to steps 501 to 506 shown in FIG. 5. Details are omitted here for simplicity.

Step 907: The parking charging system initiates a contract operation used for asset transfer, to automatically charge a parking fee.

In an implementation, blockchain node 1 corresponding to the parking charging system in the blockchain network can initiate the contract operation used for asset transfer in the blockchain network, so that after the contract operation takes effect, the corresponding blockchain asset transfer is made. For example, a state before the contract operation is shown in FIG. 4, and a state after the contract operation takes effect is shown in FIG. 8: 8 yuan is transferred from a blockchain asset corresponding to the payment platform to a blockchain asset corresponding to the parking charging system, so that the blockchain asset corresponding to the payment platform is decreased from 3000 yuan in FIGS. 4 to 2992 yuan in FIG. 8, and the blockchain asset corresponding to the parking charging system is increased from 1000 yuan in FIGS. 4 to 1008 yuan in FIG. 8.

Similar to the previously described blockchain asset transfer in step 509, the blockchain asset transfer between the payment platform and the parking charging system can be directly made based on the same anchor (as shown in FIG. 8) or can be made through relaying based on multiple anchors. Details are omitted here for simplicity.

Step 908: The payment platform performs an offchain asset transfer operation based on a monitored blockchain asset change status, and returns a corresponding offchain asset transfer result to the parking charging system.

In an implementation, based on the contract operation initiated in step 907, a blockchain asset, for example, 8 yuan, corresponding to the parking duration is transferred from the blockchain asset of the payment platform to the blockchain asset of the parking charging system. Correspondingly, the payment platform needs to charge an offchain asset corresponding to the parking duration for the vehicle "A12345", so that the payment platform achieves breakeven and complete automatic charging of the parking fee.

In an implementation, for example, as shown in FIG. 8, the payment platform can deduct an offchain asset corresponding to a payment amount from account 2 corresponding to the vehicle "A12345", for example, transfer 8 yuan from account 2 to an account of the payment platform, so that a balance of account 2 is decreased from 500 yuan in FIGS. 4 to 492 yuan in FIG. 8, and a balance of the account of the payment platform is increased from 200 yuan in FIGS. 4 to 208 yuan in FIG. 8.

In an implementation, in the current charging process, the payment platform can deduct an offchain asset corresponding to a payment amount from account 2 corresponding to the vehicle "A12345", which is equivalent to the situation that the parking fee is paid by account 2 corresponding to the vehicle "A12345". In another implementation, when account 2 has a certain credit limit on the payment platform, and the credit limit is not less than a payment amount, the payment platform may temporarily not deduct an offchain asset corresponding to the payment amount from account 2, but deduct a credit asset corresponding to the payment amount from account 2, and directly return an offchain asset transfer result of "The transfer succeeds" to the parking charging system. Subsequently, account 2 only needs to return a corresponding fund within a certain period of time, but does not need to pay in the current charging process, so that possible financial pressure of account 2 is alleviated.

Step 909: When a received offchain asset transfer result is that the payment succeeds, the parking charging system controls the corresponding timer to reset.

Step 910: After detecting that the vehicle drives away, IoT device 2 sends a corresponding vehicle departure notification to the parking charging system, where the vehicle departure notification includes the license plate number of the related vehicle obtained by IoT device 2.

Step 911: The parking charging system stops timing and charging for the parking duration of the vehicle that has driven away.

In an implementation, for steps 909 to 911, references can be made to steps 510 to 512 shown in FIG. 5. Details are omitted here for simplicity.

Based on the implementation shown in FIG. 5 or FIG. 9, in the process that a vehicle is parked in a parking space, the parking charging system cooperates with the payment platform to automatically charge a corresponding parking fee, so that after the vehicle drives away from the parking space, the parking fee has been paid for the vehicle by default. Therefore, the vehicle can directly drive away from an exit of the parking lot, and there is no need to dispose any facility impeding or hindering the driving, for example, a railing, at the exit. Therefore, it is ensured that the vehicle can drive away from the exit of the parking lot smoothly and without interruption. In addition to charging in the parking process, because a time period is needed for a vehicle to drive from a parking space to the exit, a parking fee can be automatically paid by using the time period, and normal departure of the vehicle is not affected. The following provides detailed descriptions with reference to FIG. 10 and FIG. 11.

Figure 10:
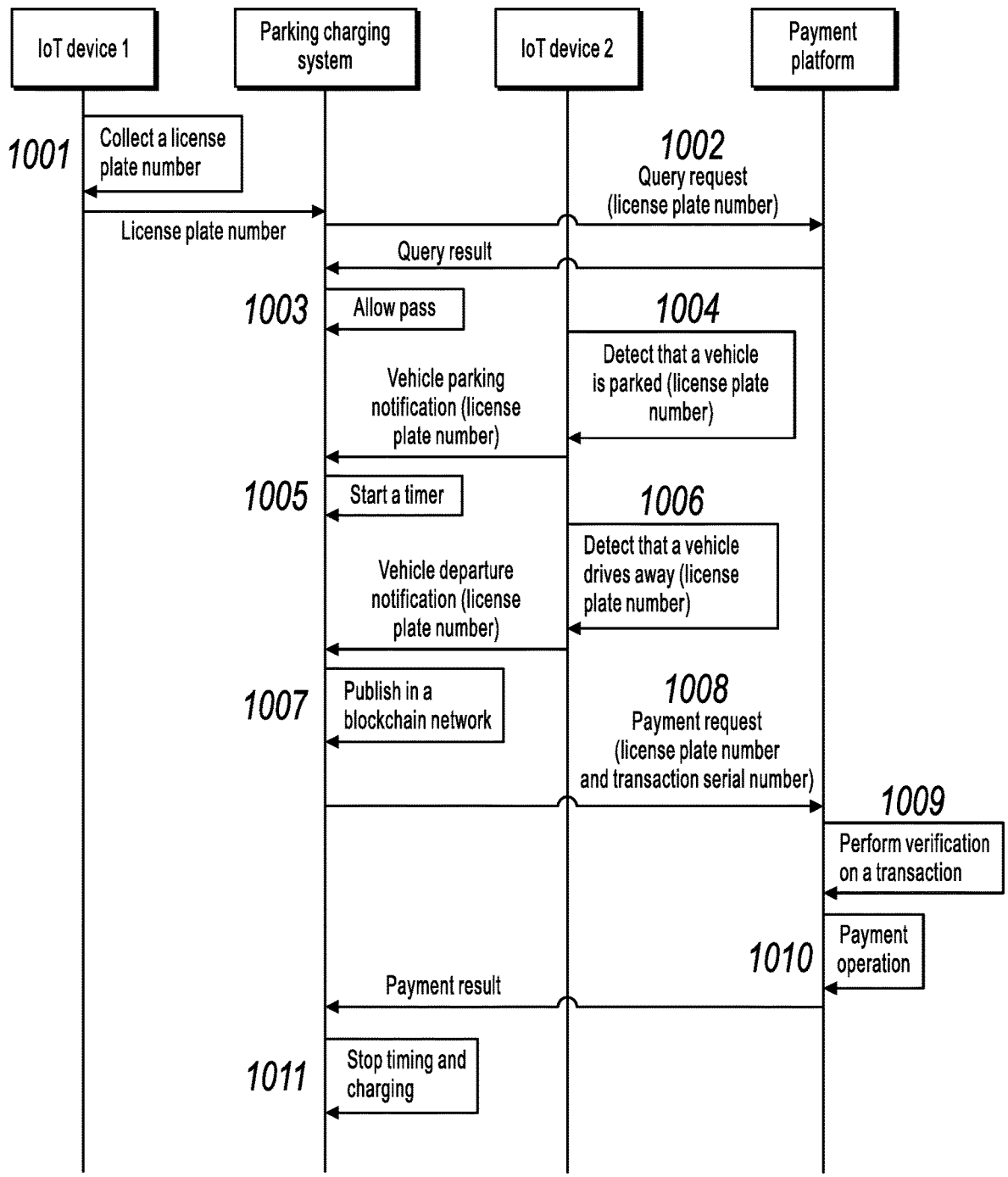
FIG. 10 is a schematic interaction diagram illustrating parking lot automatic charging, according to example implementation 2.

FIG. 10 is a schematic interaction diagram illustrating parking lot automatic charging, according to example implementation 2. As shown in FIG. 10, assume that the previously described parking charging system and IoT device 1 and IoT device 2 that are associated with the parking charging system are configured in a parking lot. The parking charging system can automatically charge a parking fee based on detection data of IoT device 1 and IoT device 2 in cooperation with a payment platform. The interaction process of the parking lot automatic charging can include the following steps.

Step 1001: IoT device 1 collects a license plate number, and sends the license plate number to the parking charging system.

Step 1002: The parking charging system sends a query request to the payment platform, where the query request includes the license plate number of the vehicle, and receives a query result returned by the payment platform.

Step 1003: When the query result is that a user account corresponding to the license plate number exists on the payment platform, allow the corresponding vehicle to pass, so that the vehicle enters the parking lot.

Step 1004: After detecting that a vehicle is parked in a parking space, IoT device 2 sends a corresponding vehicle parking notification to the parking charging system, where the vehicle parking notification includes a license plate number of the related vehicle obtained by IoT device 2.

In an implementation, for steps 1001 to 1004, references can be made to steps 501 to 504 shown in FIG. 5. Details are omitted here for simplicity.

Step 1005: The parking charging system starts a timer to record parking duration of the related vehicle based on the vehicle parking notification sent by IoT device 2.

In an implementation, assuming that a license plate number included in the vehicle parking notification is "A12345", the parking charging system can start corresponding timer 1 for "A12345", and timer 1 is dedicated to recording parking duration of the vehicle "A12345".

Step 1006: After detecting that the vehicle drives away, IoT device 2 sends a corresponding vehicle departure notification to the parking charging system, where the vehicle departure notification includes the license plate number of the related vehicle obtained by IoT device 2.

In an implementation, for step 1006, references can be made to step 511 shown in FIG. 5. Details are omitted here for simplicity.

Step 1007: The parking charging system publishes the parking duration of the related vehicle to a blockchain network in response to the vehicle departure notification.

In an implementation, assuming that the duration recorded by timer 1 is 2 hours, and the parking charging system can publish the parking duration "2 hours" of the vehicle "A12345" to the blockchain network by using blockchain node 1, so that information about the parking duration is recorded in a transaction record in a blockchain ledger. The transaction record can be uniquely mapped by using a corresponding transaction serial number, etc.

Step 1008: The parking charging system initiates a payment request to the payment platform, where the payment request includes the license plate number and a transaction serial number.

Step 1009: The payment platform performs verification on a related transaction for the payment request.

Step 1010: The payment platform triggers a payment operation.

In an implementation, for steps 1008 to 1010, references can be made to steps 507 to 509 shown in FIG. 5. Details are omitted here for simplicity.

In an implementation, assuming that the parking duration is 2 hours and a charging rule is 8 yuan/hour, a payment amount corresponding to the parking duration is 16 yuan. The process of automatically charging the parking fee of 16 yuan is similar to the process of charging the parking fee of 8 yuan in FIG. 5. Details are omitted here for simplicity.

Step 1011: The parking charging system stops timing and charging for the parking duration of the vehicle that has driven away.

In an implementation, assuming that the license plate number included in the vehicle departure notification received by the parking charging system is "A12345", the parking charging system can terminate timer 1 corresponding to "A12345", so as to stop charging the vehicle "A12345".

In an implementation, in the process that the vehicle "A12345" drives away from the parking space and drives to an exit of the parking lot, the parking charging system has cooperated with the payment platform to charge the corresponding parking fee, so that the vehicle "A12345" can directly drive away from the exit of the parking lot, and there is no need to dispose any facility that may impede or hinder the driving, for example, a railing, at the exit. Therefore, it is ensured that the vehicle "A12345" can drive away from the exit of the parking lot smoothly and without interruption, thereby enhancing user experience and maintaining driving safety and driving order in the parking lot.

Figure 11:
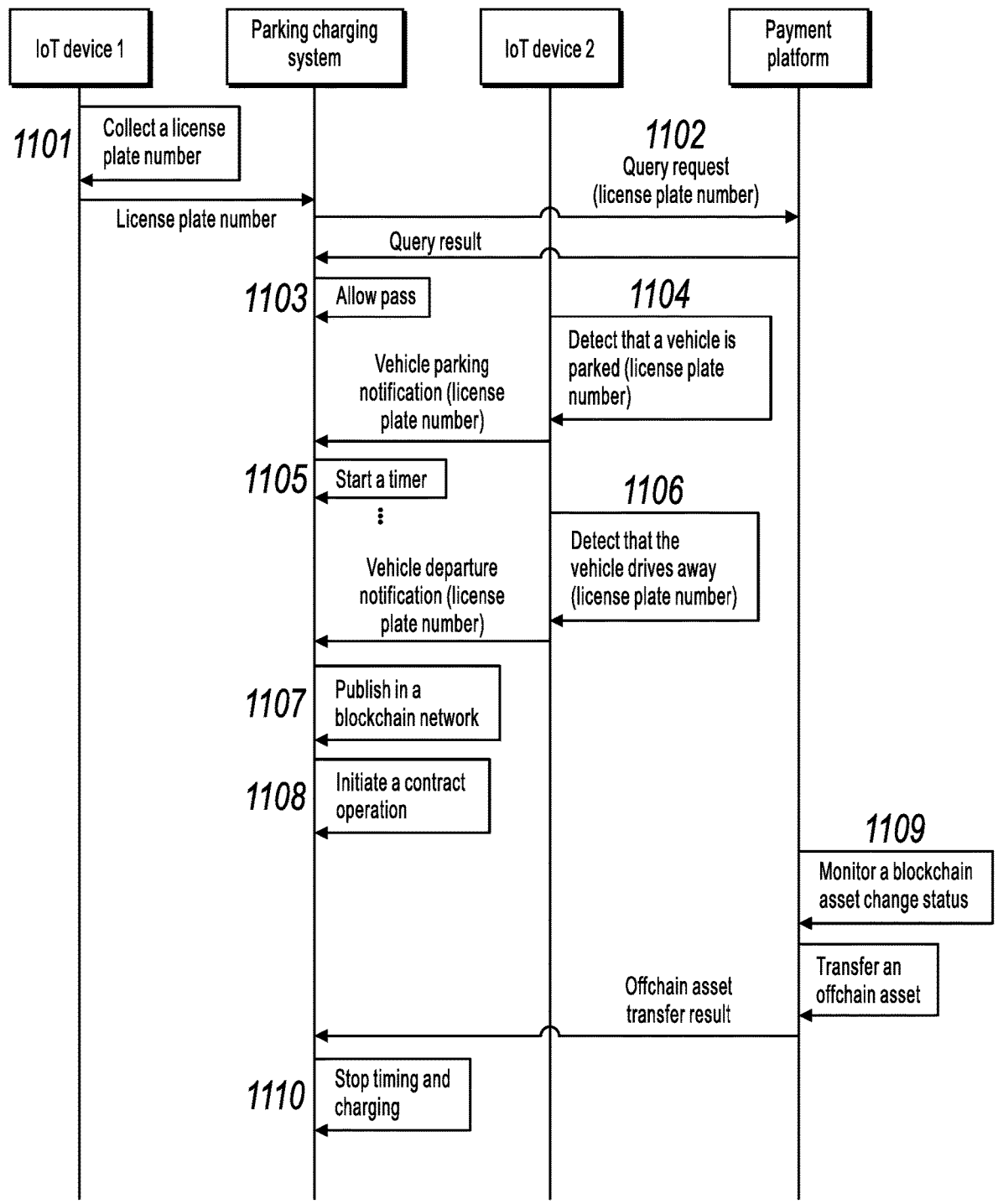
FIG. 11 is a schematic interaction diagram illustrating another type of parking lot automatic charging, according to example implementation 2.

In the implementation shown in FIG. 10, a contract operation can be initiated by the payment platform in the blockchain network to complete the corresponding payment operation. In other implementations, the parking charging system can further initiate the contract operation in the blockchain network. The following provides descriptions with reference to FIG. 11. FIG. 11 is a schematic interaction diagram illustrating another type of parking lot automatic charging, according to example implementation 2. As shown in FIG. 11, assume that the previously described parking charging system and IoT device 1 and IoT device 2 that are associated with the parking charging system are configured in a parking lot. The parking charging system can automatically charge a parking fee based on detection data of IoT device 1 and IoT device 2 in cooperation with a payment platform. The interaction process of the parking lot automatic charging can include the following steps.

Step 1101: IoT device 1 collects a license plate number, and sends the license plate number to the parking charging system.

Step 1102: The parking charging system sends a query request to the payment platform, where the query request includes the license plate number of the vehicle, and receives a query result returned by the payment platform.

Step 1103: When the query result is that a user account corresponding to the license plate number exists on the payment platform, allow the corresponding vehicle to pass, so that the vehicle enters the parking lot.

Step 1104: After detecting that a vehicle is parked in a parking space, IoT device 2 sends a corresponding vehicle parking notification to the parking charging system, where the vehicle parking notification includes a license plate number of the related vehicle obtained by IoT device 2.

Step 1105: The parking charging system starts a timer to record parking duration of the related vehicle based on the vehicle parking notification sent by IoT device 2.

Step 1106: After detecting that the vehicle drives away, IoT device 2 sends a corresponding vehicle departure notification to the parking charging system, where the vehicle departure notification includes the license plate number of the related vehicle obtained by IoT device 2.

Step 1107: The parking charging system publishes the parking duration of the related vehicle to a blockchain network in response to the vehicle departure notification.

In an implementation, for steps 1101 to 1107, references can be made to steps 1001 to 1007 shown in FIG. 10. Details are omitted here for simplicity.

Step 1108: The parking charging system initiates a contract operation used for asset transfer, to automatically charge a parking fee.

Step 1109: The payment platform performs an offchain asset transfer operation based on a monitored blockchain asset change status, and returns a corresponding offchain asset transfer result to the parking charging system.

In an implementation, for steps 1108 and 1109, references can be made to steps 907 and 908 shown in FIG. 9. Details are omitted here for simplicity.

Step 1110: When the received offchain asset transfer result is that the payment succeeds, the parking charging system stops timing and charging for the parking duration of the vehicle that has driven away.

Figure 12:
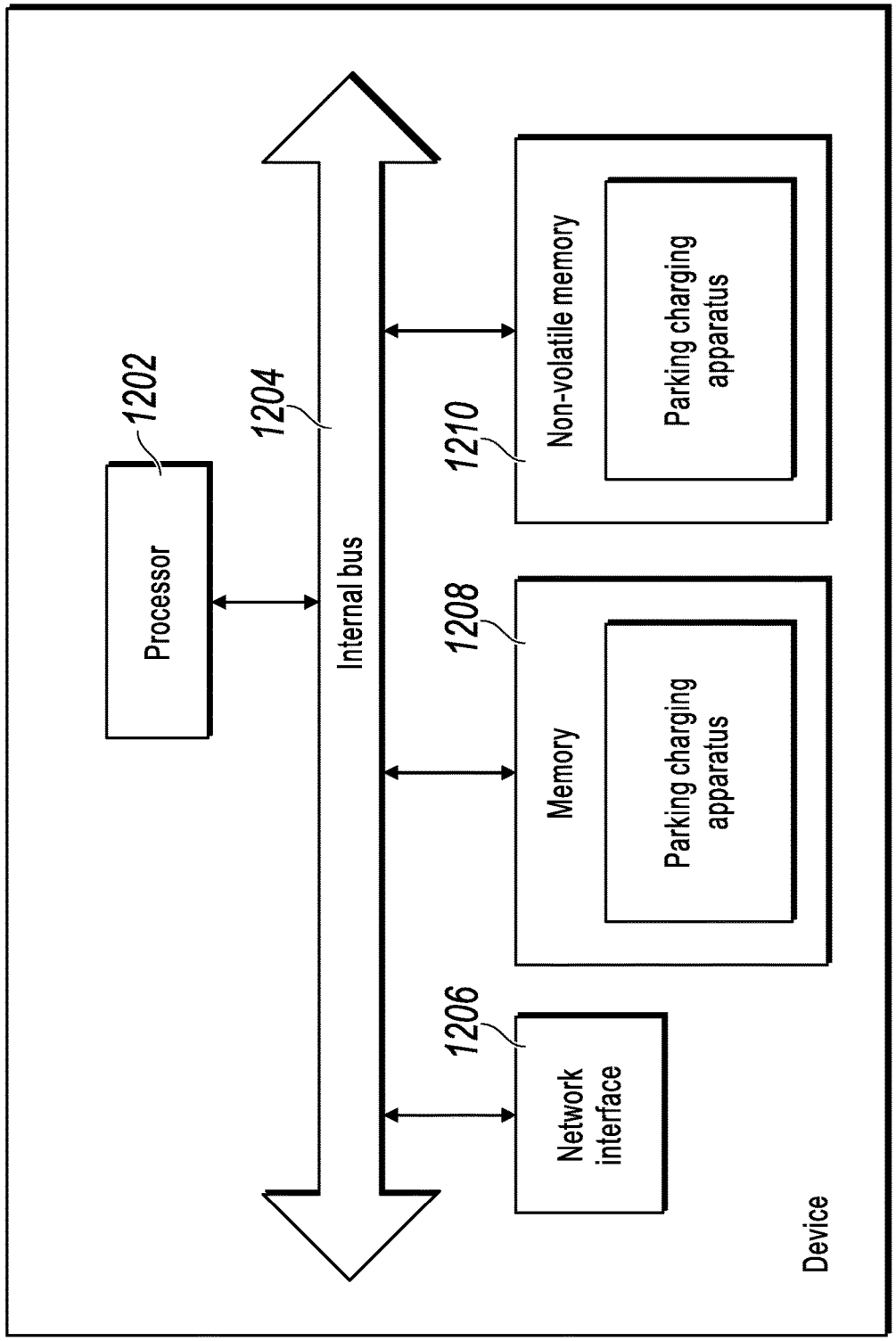
FIG. 12 is a schematic structural diagram illustrating a device, according to an example implementation.

FIG. 12 is a schematic structural diagram illustrating a device, according to an example implementation. As shown in FIG. 12, in terms of hardware, the device includes a processor 1202, an internal bus 1204, a network interface 1206, a memory 1208, and a non-volatile memory 1210, and certainly can further include other hardware needed by services. The processor 1202 reads a corresponding computer program from the non-volatile memory 1210 to the memory 1208 for running, so that a parking charging apparatus is logically formed. Certainly, in addition to the software implementation, one or more implementations of the present specification do not exclude other implementations, for example, a logical device or a combination of hardware and software. In other words, an execution body of the following processing procedure is not limited to each logical unit, and can also be hardware or a logical device.

Figure 13:
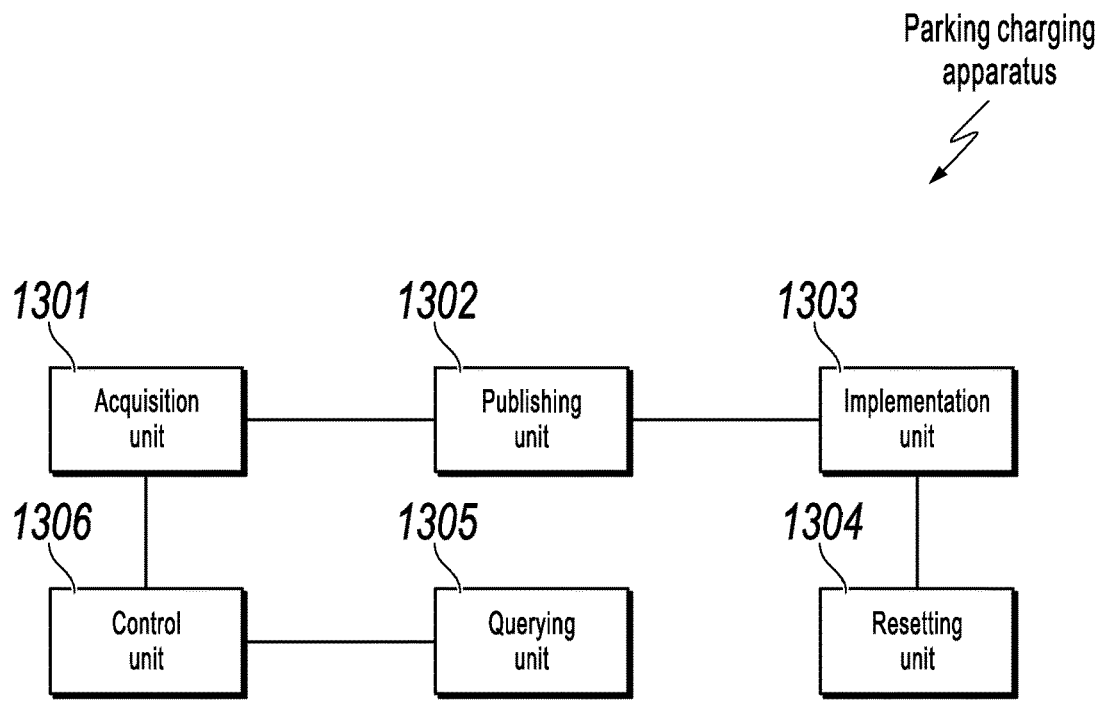
FIG. 13 is a block diagram illustrating a parking charging apparatus, according to an example implementation.

In an implementation, as shown in FIG. 13, in a software implementation, the parking charging apparatus is applied to a parking charging system, and the apparatus can include the following: an acquisition unit 1301, configured to obtain vehicle information of a parked vehicle in a parking space, where the vehicle information has a corresponding user account on a payment platform; a publishing unit 1302, configured to publish a vehicle parking record to a blockchain network by using a first blockchain node corresponding to the parking charging system in the blockchain network, where the vehicle parking record includes parking duration of the parked vehicle in the parking space; and an implementation unit 1303, configured to perform an asset transfer operation related to the payment platform based on the vehicle parking record each time the parking duration reaches first predetermined duration, so as to charge an asset corresponding to the first predetermined duration.

Optionally, the acquisition unit 1301 is specifically configured to perform an information acquisition operation at the parking space by using a first Internet of Things device associated with the parking charging system; and determine the vehicle information of the parked vehicle based on information obtained by the first Internet of Things device.

Optionally, the first Internet of Things device is dedicated to the parking space; or the first Internet of Things device is used for the parking space and at least one other parking space.

Optionally, the first Internet of Things device includes at least one of the following: a monitoring device, an RFID reader, a Bluetooth device, an optical sensor, and a signal receiver.

Optionally, the acquisition unit 1301 is specifically configured to: when it is determined that there is a parked vehicle in the parking space by using the first Internet of Things device, further perform an information acquisition operation on the parked vehicle by using the first Internet of Things device; or when it is determined that there is a parked vehicle in the parking space by using a second Internet of Things device associated with the parking charging system, further perform an information acquisition operation on the parked vehicle by using the first Internet of Things device.

Optionally, the implementation unit 1303 is specifically configured to: each time the parking duration reaches the first predetermined duration, initiate an asset charging request for the vehicle information to the payment platform, where the asset charging request includes an identifier of the vehicle parking record; and charge an asset transferred by the payment platform from the user account; or when a credit limit of the user account is not exceeded, charge a credit asset related to the user account and transferred by the payment platform.

Optionally, the implementation unit 1303 is specifically configured to: each time the parking duration reaches the first predetermined duration, initiate a contract operation used for asset transfer by using the first blockchain node, where a validation condition of the contract operation includes that the parking duration reaches the first predetermined duration; and after the contract operation takes effect, receive, by using the first blockchain node, a blockchain asset corresponding to the first predetermined duration and transferred by a second blockchain node corresponding to the payment platform in the blockchain network, where an offchain asset equivalent to the blockchain asset is deducted from the user account by the payment platform.

Optionally, the implementation unit 1303 is specifically configured to: when the parking duration reaches the first predetermined duration, perform the asset transfer operation related to the payment platform based on the vehicle parking record; and after the asset corresponding to the first predetermined duration is charged, reset the parking duration to recalculate the parking duration.

Optionally, the vehicle parking record further includes total parking duration of the parked vehicle in a parking lot in which the parking space is located, so that the asset corresponding to the first predetermined duration satisfies a charging criterion corresponding to a duration range within which the total parking duration falls.

Optionally, the apparatus further includes the following: a resetting unit 1304, configured to reset the total parking duration when the parked vehicle drives away from the parking space; or reset the total parking duration when the parked vehicle drives away from the parking space and is not parked in any parking space in the parking lot within second predetermined duration; or reset the total parking duration when the parked vehicle drives away from the parking lot.

Optionally, the apparatus further includes the following: a querying unit 1305, configured to: when any vehicle drives to an entrance of a parking lot in which the parking space is located, initiate a query request to the payment platform based on vehicle information of the any vehicle; and a control unit 1306, configured to: when it is determined that a user account corresponding to the vehicle information of the any vehicle exists on the payment platform, allow the any vehicle to pass, so that the any vehicle enters the parking lot; otherwise, refuse the any vehicle to pass.

Figure 14:
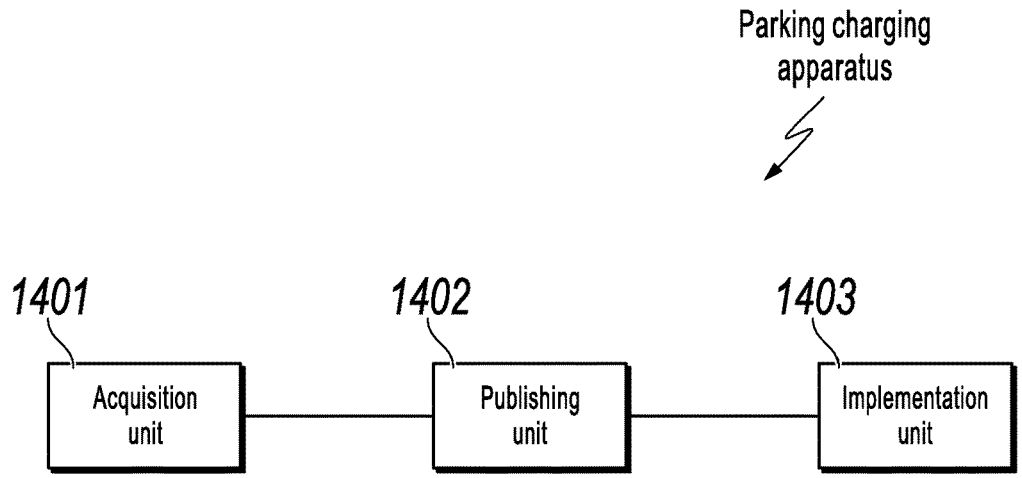
FIG. 14 is a block diagram illustrating another parking charging apparatus, according to an example implementation.

In another implementation, as shown in FIG. 14, in a software implementation, the parking charging apparatus is applied to a parking charging system, and the apparatus can include the following: an acquisition unit 1401, configured to obtain vehicle information of a parked vehicle in a parking space, where the vehicle information has a corresponding user account on a payment platform; a publishing unit 1402, configured to publish a vehicle parking record to a blockchain network by using a first blockchain node corresponding to the parking charging system in the blockchain network, where the vehicle parking record includes parking duration of the parked vehicle in the parking space; and an implementation unit 1403, configured to: when it is detected that the parked vehicle drives away from the parking space, perform an asset transfer operation related to the payment platform based on the vehicle parking record, so as to charge an asset corresponding to the parking duration.

The system, apparatus, module, or unit illustrated in the previous implementations can be specifically implemented by using a computer chip or an entity, or can be implemented by using a product having a certain function. A typical implementation device is a computer, and the computer can be specifically a personal computer, a laptop computer, a cellular phone, a camera phone, a smartphone, a personal digital assistant, a media player, a navigation device, an email receiving and sending device, a game console, a tablet, a wearable device, or any combination of these devices.

In a typical configuration, a computer includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a magnetic disk storage, a quantum memory, a grapheme-based storage medium, or another magnetic storage device or any other non-transmission medium. The computer storage medium can be configured to store information that can be accessed by a computing device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

Terms used in one or more implementations of the present specification are merely used to describe specific implementations, and are not intended to limit the one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more implementations of the present specification to describe various types of information, the information is not limited to these terms. These terms are only used to differentiate between information of the same type. For example, without departing from the scope of one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method for parking fee collection, comprising:
   detecting, by using one or more sensors comprised in an Internet of Things (IoT) device located in a position directed to a parking space, that a vehicle is parked in the parking space;
   in response to determining that the vehicle is parked in the parking space, obtaining, by the IoT device, information of the vehicle, wherein the information is associated with a user account of a payment platform;
   recording, for the vehicle and to a blockchain, a parking record by using a first blockchain node corresponding to a parking fee charging system in a blockchain network, wherein the parking record comprises a duration that the vehicle is parked in the parking space;
   sending, to the payment platform, an asset transfer request comprising an identifier of the parking record for the payment platform to verify the parking record on the blockchain through a second blockchain node associated with the payment platform;
   and after the parking record is verified by the payment platform and in response to determining that the duration that the vehicle parked in the parking space reaches a predetermined time period, determining, by an anchor node of the blockchain network associated with the parking fee charging system, a parking fee corresponding to the predetermined time period, wherein the anchor node provides one-to-one mapping between blockchain assets and real world assets;
   determining, by the anchor node, a blockchain asset equivalent in value to the parking fee is less than or equal to a mapped real world asset of the user account registered on the payment platform;
   and transferring, by the anchor node, the blockchain asset equivalent in value to the parking fee from the user account to a blockchain account of the parking fee charging system.

2. The computer-implemented method of claim 1, wherein the IoT device further comprises at least one of a monitoring device, a radio frequency identifier (RFID) reader, a Bluetooth device, or a signal receiver.

3. The computer-implemented method of claim 1, wherein the IoT device is a first IoT device, and the information of the vehicle is obtained by the first IoT device and a second IoT device.

4. The computer-implemented method of claim 1, wherein transferring the blockchain asset further comprises initiating a parking fee collection request for the vehicle to the payment platform, wherein the parking fee collection request includes an identifier of the parking record, and wherein the parking fee is paid for by a credit payment from the user account corresponding to the vehicle when a credit limit of the user account is not exceeded.

5. The computer-implemented method of claim 1, wherein transferring the blockchain asset further comprises:
   performing a smart contract operation for transferring the blockchain asset from the first blockchain node to the anchor node for converting to the parking fee to be transferred to a second blockchain node corresponding to the parking fee charging system, wherein a validation condition of the smart contract operation is that the duration reaches the predetermined time period.

6. The computer-implemented method of claim 1, further comprising:
   after the parking fee corresponding to the predetermined time period is transferred, resetting a time for determining whether the vehicle is parked in the parking space for the predetermined time period.

7. The computer-implemented method of claim 1, wherein transferring the blockchain asset further comprises initiating a parking fee collection request for the vehicle to the payment platform, and wherein the parking fee collection request includes an amount of parking fee determined based on a time period the vehicle is parked at the parking space and a correspondence between parking time ranges and payment fees.

8. The computer-implemented method of claim 7, wherein the predetermined time period is a first predetermined time period, and the method further comprising:
   resetting a time associated with the parking space in response to determining that the vehicle has left the parking space and is not parked in another parking space in a parking lot the parking space is located within a second predetermined time period.

9. The computer-implemented method of claim 1, further comprising:
   automatically providing entrance of the vehicle to a parking lot where the parking space is located in response to determining that the user account corresponding to the vehicle exists on the payment platform.

10. A computer-implemented system, comprising:
    one or more computers;
    and one or more computer memory devices interoperably coupled with the one or more computers and having tangible, non-transitory, machine-readable media storing one or more instructions that, when executed by the one or more computers, perform operations for parking fee collection, comprising:
    detecting, by using one or more sensors comprised in an Internet of Things (IoT) device located in a position directed to a parking space, that a vehicle is parked in the parking space;
    in response to determining that the vehicle is parked in the parking space, obtaining, by the IoT device, information of the vehicle, wherein the information is associated with a user account of a payment platform;
    recording, for the vehicle and to a blockchain, a parking record by using a first blockchain node corresponding to a parking fee charging system in a blockchain network, wherein the parking record comprises a duration that the vehicle is parked in the parking space;
    sending, to the payment platform, an asset transfer request comprising an identifier of the parking record for the payment platform to verify the parking record on the blockchain through a second blockchain node associated with the payment platform;
    and after the parking record is verified by the payment platform and in response to determining that the duration that the vehicle parked in the parking space reaches a predetermined time period, determining, by an anchor node of the blockchain network associated with the parking fee charging system, a parking fee corresponding to the predetermined time period, wherein the anchor node provides one-to-one mapping between blockchain assets and real world assets;

determining, by the anchor node, a blockchain asset equivalent in value to the parking fee is less than or equal to a mapped real world asset of the user account registered on the payment platform;

and transferring, by the anchor node, the blockchain asset equivalent in value to the parking fee from the user account to a blockchain account of the parking fee charging system.

11. The computer-implemented system of claim 10, wherein the IoT device further comprises at least one of a monitoring device, a radio frequency identifier (RFID) reader, a Bluetooth device, or a signal receiver.

12. The computer-implemented system of claim 10, wherein the IoT device is a first IoT device, and the information of the vehicle is obtained by the first IoT device and a second IoT device.

13. The computer-implemented system of claim 10, wherein transferring the blockchain asset further comprises initiating a parking fee collection request for the vehicle to the payment platform, wherein the parking fee collection request includes an identifier of the parking record, and wherein the parking fee is paid for by a credit payment from the user account corresponding to the vehicle when a credit limit of the user account is not exceeded.

14. The computer-implemented system of claim 10, wherein transferring the blockchain asset further comprises:

performing a smart contract operation for transferring the blockchain asset from the first blockchain node to the anchor node for converting to the parking fee to be transferred to a second blockchain node corresponding to the parking fee charging system, wherein a validation condition of the smart contract operation is that the duration reaches the predetermined time period.

15. The computer-implemented system of claim 10, further comprising:

after the parking fee corresponding to the predetermined time period is transferred, resetting a time for determining whether the vehicle is parked in the parking space for the predetermined time period.

16. The computer-implemented system of claim 10, wherein transferring the blockchain asset further comprises initiating a parking fee collection request for the vehicle to the payment platform, and wherein the parking fee collection request includes an amount of parking fee determined based on a time period the vehicle is parked at the parking space and a correspondence between parking time ranges and payment fees.

17. The computer-implemented system of claim 16, wherein the predetermined time period is a first predetermined time period, and further comprising:

resetting a time associated with the parking space in response to determining that the vehicle has left the parking space and is not parked in another parking space in a parking lot the parking space is located within a second predetermined time period.

18. The computer-implemented system of claim 10, further comprising:

automatically providing entrance of the vehicle to a parking lot where the parking space is located in response to determining that the user account corresponding to the vehicle exists on the payment platform.

19. A non-transitory, computer-readable medium storing one or more instructions executable by a computer system to perform operations for parking fee collection, comprising:

detecting, by using one or more sensors comprised in an Internet of Things (IoT) device located in a position directed to a parking space, that a vehicle is parked in the parking space;

in response to determining that the vehicle is parked in the parking space, obtaining, by the IoT device, information of the vehicle, wherein the information is associated with a user account of a payment platform;

recording, for the vehicle and to a blockchain, a parking record by using a first blockchain node corresponding to a parking fee charging system in a blockchain network, wherein the parking record comprises a duration that the vehicle is parked in the parking space;

sending, to the payment platform, an asset transfer request comprising an identifier of the parking record for the payment platform to verify the parking record on the blockchain through a second blockchain node associated with the payment platform;

and after the parking record is verified by the payment platform and in response to determining that the duration that the vehicle parked in the parking space reaches a predetermined time period, determining, by an anchor node of the blockchain network associated with the parking fee charging system, a parking fee corresponding to the predetermined time period, wherein the anchor node provides one-to-one mapping between blockchain assets and real world assets;

determining, by the anchor node, a blockchain asset equivalent in value to the parking fee is less than or equal to a mapped real world asset of the user account registered on the payment platform;

and transferring, by the anchor node, the blockchain asset equivalent in value to the parking fee from the user account to a blockchain account of the parking fee charging system.

20. The non-transitory, computer-readable medium of claim 19, wherein the IoT device further comprises at least one of a monitoring device, a radio frequency identifier (RFID) reader, a Bluetooth device, or a signal receiver.

21. The non-transitory, computer-readable medium of claim 19, wherein transferring the blockchain asset further comprises initiating a parking fee collection request for the vehicle to the payment platform, wherein the parking fee collection request includes an identifier of the parking record, and wherein the parking fee is paid for by a credit payment from the user account corresponding to the vehicle when a credit limit of the user account is not exceeded.

22. The non-transitory, computer-readable medium of claim 19, wherein transferring the blockchain asset further comprises:

performing a smart contract operation for transferring the blockchain asset from the first blockchain node to the anchor node for converting to the parking fee to be transferred to a second blockchain node corresponding to the parking fee charging system, wherein a validation condition of the smart contract operation is that the duration reaches the predetermined time period.

23. The non-transitory, computer-readable medium of claim 19, wherein transferring the blockchain asset further comprises initiating a parking fee collection request for the vehicle to the payment platform, and wherein the parking fee collection request includes an amount of parking fee determined based on a time period the vehicle is parked at the parking space and a correspondence between parking time ranges and payment fees.

24. The non-transitory, computer-readable medium of claim 23, wherein:
   the predetermined time period is a first predetermined time period, and further comprising:
   resetting a time associated with the parking space in response to determining that the vehicle has left the parking space and is not parked in another parking space in a parking lot the parking space is located within a second predetermined time period.

25. The non-transitory, computer-readable medium of claim 19, further comprising:
   automatically providing entrance of the vehicle to a parking lot where the parking space is located in response to determining that the user account corresponding to the vehicle exists on the payment platform.

* * * * *